(12) United States Patent
Hiroi et al.

(10) Patent No.: US 12,534,637 B2
(45) Date of Patent: Jan. 27, 2026

(54) COATING FILM HAVING THINLY-SPREADING AND IRREGULARITY-CONFORMING PROPERTIES, AND STRUCTURAL BASE HAVING SUCH FILM

(71) Applicant: NISSAN CHEMICAL CORPORATION, Tokyo (JP)

(72) Inventors: Yoshiomi Hiroi, Funabashi (JP); Natsuki Abe, Shiraoka (JP); Taito Nishino, Shiraoka (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/634,755

(22) Filed: Apr. 12, 2024

(65) Prior Publication Data

US 2024/0287346 A1 Aug. 29, 2024

Related U.S. Application Data

(62) Division of application No. 16/319,293, filed as application No. PCT/JP2017/025878 on Jul. 18, 2017, now abandoned.

(30) Foreign Application Priority Data

Jul. 20, 2016 (JP) .................................. 2016-142119

(51) Int. Cl.
   *C09D 133/14* (2006.01)
   *B05D 3/00* (2006.01)
   (Continued)

(52) U.S. Cl.
   CPC ............. *C09D 133/14* (2013.01); *B05D 3/00* (2013.01); *B05D 7/24* (2013.01); *C09D 133/26* (2013.01);
   (Continued)

(58) Field of Classification Search
   CPC .. C09D 133/14; C09D 133/26; C09D 165/04; B05D 3/00; B05D 7/24
   See application file for complete search history.

(56) References Cited

U.S. PATENT DOCUMENTS

2002/0155617 A1* 10/2002 Pham .................... G01N 33/542
                                                                 422/547
2009/0061513 A1    3/2009 Andersson Svahn et al.
(Continued)

FOREIGN PATENT DOCUMENTS

| JP | 2008-537679 A | 9/2008 |
| JP | 2014-501099 A | 1/2014 |

(Continued)

OTHER PUBLICATIONS

Japanese Patent Office, International Search Report in International Patent Application No. PCT/JP2017/025878 (Oct. 10, 2017).
(Continued)

*Primary Examiner* — Nathan T Leong
(74) *Attorney, Agent, or Firm* — Leydig, Voit & Mayer, Ltd.

(57) ABSTRACT

The invention provides a structural base that includes a coating film on at least a portion of the surface thereof, the coating film having a difference between the maximum film thickness and the minimum film thickness of not more than 1000 Å. A method of the invention produces such structural bases. The coating film includes a copolymer including a repeating unit containing a group represented by formula (a), and a repeating unit containing a group represented by formula (b):

(Continued)

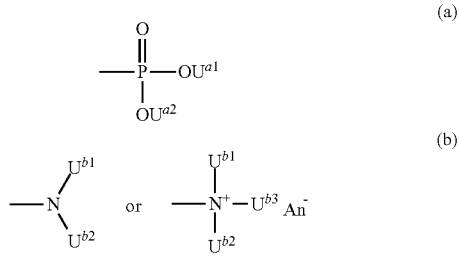

wherein $U^{a1}$, $U^{a2}$, $U^{b1}$, $U^{b2}$, $U^{b3}$ and $An^-$ are as defined herein.

8 Claims, 4 Drawing Sheets

(51) Int. Cl.
| | | |
|---|---|---|
| | *B05D 7/24* | (2006.01) |
| | *C09D 133/26* | (2006.01) |
| | *C09D 165/04* | (2006.01) |
| | *C12M 1/00* | (2006.01) |
| | *C12M 1/22* | (2006.01) |
| | *C12M 1/32* | (2006.01) |
| | *C12M 1/34* | (2006.01) |
| | *C12M 3/00* | (2006.01) |
| | *G01N 21/77* | (2006.01) |
| | *C08G 61/04* | (2006.01) |

(52) U.S. Cl.
CPC ............ *C09D 165/04* (2013.01); *C12M 1/00* (2013.01); *C12M 1/34* (2013.01); *C12M 3/00* (2013.01); *C12M 23/10* (2013.01); *C12M 23/12* (2013.01); *C12M 23/20* (2013.01); *G01N 21/7703* (2013.01); *C08G 61/04* (2013.01); *C08G 2261/12* (2013.01); *C08G 2261/143* (2013.01); *C08G 2261/147* (2013.01)

(56) References Cited

U.S. PATENT DOCUMENTS

| | | | |
|---|---|---|---|
| 2012/0208127 | A1 | 8/2012 | Hatakeyama |
| 2014/0227784 | A1* | 8/2014 | Ejiri ................. C12M 23/20 |
| | | | 435/395 |
| 2014/0322806 | A1 | 10/2014 | Bennett et al. |
| 2016/0115435 | A1* | 4/2016 | Otani ................. C08F 230/02 |
| | | | 427/353 |
| 2016/0122576 | A1 | 5/2016 | Hiroi et al. |
| 2017/0349777 | A1 | 12/2017 | Hiroi et al. |
| 2018/0305652 | A1 | 10/2018 | Katayama et al. |
| 2019/0218413 | A1 | 7/2019 | Hiroi et al. |

FOREIGN PATENT DOCUMENTS

| | | |
|---|---|---|
| WO | WO 2006/108180 A2 | 10/2006 |
| WO | WO 2012/080473 A1 | 6/2012 |
| WO | WO 2014/196552 A1 | 12/2014 |
| WO | WO 2014/196650 A1 | 12/2014 |
| WO | WO2014196652 * | 12/2014 |
| WO | WO 2016/093293 A1 | 6/2016 |
| WO | WO 2017/065279 A1 | 4/2017 |

OTHER PUBLICATIONS

U.S. Appl. No. 16/319,293, filed Apr. 5, 2019.

* cited by examiner

← EXAMPLE 10

← COMPARATIVE EXAMPLE 6

(A) EXAMPLE 10

(B) COMPARATIVE EXAMPLE 6

COATING FILM HAVING THINLY-SPREADING AND IRREGULARITY-CONFORMING PROPERTIES, AND STRUCTURAL BASE HAVING SUCH FILM

CROSS-REFERENCE TO RELATED APPLICATIONS

This patent application is a divisional of co-pending U.S. patent application Ser. No. 16/319,293, filed Apr. 5, 2019, which is the U.S. national phase of International Patent Application No. PCT/JP2017/025878, filed on Jul. 18, 2017, which claims the benefit of Japanese Patent Application No. 2016-142119, filed Jul. 20, 2016, the disclosures of which are incorporated herein by reference in their entireties for all purposes.

TECHNICAL FIELD

The present invention relates to a structural base which has, on at least a portion of the surface thereof, a coating film with a difference between the maximum film thickness and the minimum film thickness of not more than 1000 Å, and to a method for manufacturing such structural bases.

BACKGROUND ART

Structural bases made of various materials are coated with films to modify the properties of the surface in accordance with needs. The development of a variety of coating agents has increasingly expanded the applications of such coating techniques. For example, conformal coating agents are capable of forming a coating even along the surface of a structural base having a complicated shape. The development and marketing of such conformal coating agents range from electronic materials to medical materials.

For example, microwell plates are experimental and testing tools which are flat plates having a multiplicity, such as 6, 24, 96 or 384, of pockets (holes or wells, each several μL to several mL in volume) arranged in a 2:3 ratio. They are typical structural bases used in the medical field. The plates are usually made of resins, and the wells disposed in the plates are used as test tubes or petri dishes in which organic reactions, biochemical assays, clinical examinations and the like are performed. The inner surface of the plates or wells may have a coating film in accordance with the properties of the plate material or the purpose of the wells.

The use of fiber optic faceplates for chemical reactions and bioassays has encountered problems (such as, for example, optical bleeding and physical interferences between neighboring reaction chambers). To alleviate such problems, an array has been presented which includes a substrate that is a fiber optic faceplate having a top surface with a plurality of reaction chambers, and a thin film coating on the top surface, wherein the thin film is 0.1-5.0 microns thick and is impermeable to water. An example of the thin film coating is silicon dioxide. (See, for example, Patent Literature 1.) Further, it has been reported that the surface of a cell culture carrier is modified by the application of a coating formed of a thermoresponsive polymer, a pH responsive polymer or a combination thereof. Some example pH responsive polymers are copolymers of acrylic acid, dimethylaminoethyl acrylate and hydroxyethyl acrylate. (See, for example, Patent Literature 2.)

The inventors of the present invention carried out studies focusing on phosphate group-containing polymers expected as coating materials inhibitory to the adhesion of various biomaterials. As a result, the present inventors have reported that a cell culture vessel which is at least partly coated with a copolymer containing specific anionic group and cationic group is resistant to the adhesion of cells to the surface (inner surface) of the vessel, and that the coating can be firmly fixed to the surface of the vessel and thus rarely leaches into a culture, and the cell culture vessel is improved in radiation resistance (see, for example, Patent Literature 3).

CITATION LIST

Patent Literature

Patent Literature 1: Japanese Patent Kohyo Publication No. 2008-537679
Patent Literature 2: Japanese Patent Kohyo Publication No. 2014-501099
Patent Literature 3: WO 2014/0196652

SUMMARY OF INVENTION

Technical Problem

Structural bases that are brought into contact with biological samples have a problem in that cells and proteins originating from biological samples are adhered to the surface of the base to cause clogging or a decrease in analytical accuracy or sensitivity. An approach to this problem is to coat the structural base with a coating agent inhibitory to biomaterial adhesion. Unfortunately, bases with a complicated and fine structure such as microwell plates having a multiplicity of several μL to several mL wells cannot be coated with a uniform thickness due to the fact that the coating agent accumulates at the edges or bottoms of the wells. Further, the excess of coating film thickness over the measurement wavelength adversely affects optical measurement using a plate reader or the like.

Objects of the present invention are therefore to provide a structural base which has a uniform and thin coating film that is highly inhibitory to biomaterial adhesion and does not adversely affect measurements such as optical measurement, and to provide a method for producing such structural bases.

Solution to Problem

The present inventors have found that a polymer which inhibits biomaterial adhesion, in particular, a copolymer which includes a specific anionic structure and a specific cationic structure can form a coating film on the surface of a structural base through a very simple operation while ensuring that the difference between the maximum film thickness and the minimum film thickness is not more than 1000 Å, or preferably not more than 300 Å. The present inventors have also found that a coating film obtained as described above is highly inhibitory to biomaterial adhesion and does not adversely affect measurements such as optical measurement. The present invention has been completed based on these findings.

Aspects of the present invention reside in the following.

[1] A structural base comprising a coating film on at least a portion of the surface thereof, the coating film having a difference between the maximum film thickness and the minimum film thickness of not more than 1000 Å, the coating film comprising a copolymer including a repeating unit containing a group represented by the following formula (a), and a repeating unit containing a group represented by the following formula (b):

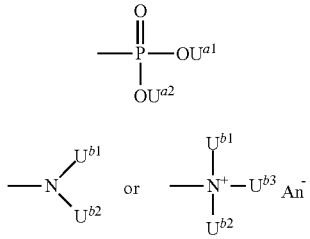
(a)
(b)

wherein
$U^{a1}$, $U^{a2}$, $U^{b1}$, $U^{b2}$ and $U^{b3}$ are each independently a hydrogen atom or a $C_{1-5}$ linear or branched alkyl group, and An is an anion selected from the group consisting of halide ion, inorganic acid ion, hydroxide ion and isothiocyanate ion.

[2] The structural base described in [1], wherein the copolymer includes repeating units represented by the following formulae (a1) and (b1):

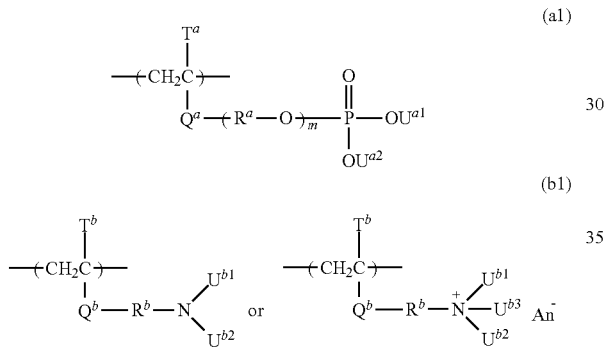
(a1)
(b1)

wherein
$T^a$ and $T^b$ are each independently a hydrogen atom or a $C_{1-5}$ linear or branched alkyl group;
$Q^a$ and $Q^b$ are each independently a single bond, an ester bond or an amide bond;
$R^a$ and $R^b$ are each independently a $C_{1-10}$ linear or branched alkylene group which may be substituted with a halogen atom;
$U^{a1}$, $U^{a2}$, $U^{b1}$, $U^{b2}$ and $U^{b3}$ are each independently a hydrogen atom or a $C_{1-5}$ linear or branched alkyl group;
$An^-$ is an anion selected from the group consisting of halide ion, inorganic acid ion, hydroxide ion and isothiocyanate ion; and
m is an integer of 0 to 6.

[3] The structural base described in [1] or [2], wherein the copolymer is one obtained by polymerizing a monomer mixture including compounds represented by the following formulae (A) and (B):

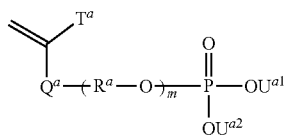
(A)

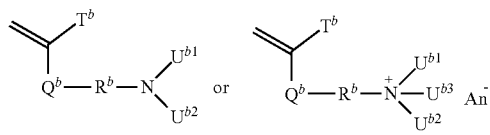
(B)

wherein
$T^a$, $T^b$, $U^{a1}$, $U^{a2}$, $U^{b1}$, $U^{b2}$ and $U^{b3}$ are each independently a hydrogen atom or a $C_{1-5}$ linear or branched alkyl group;
$Q^a$ and $Q^b$ are each independently a single bond, an ester bond or an amide bond;
$R^a$ and $R^b$ are each independently a $C_{1-10}$ linear or branched alkylene group which may be substituted with a halogen atom;
$An^-$ is an anion selected from the group consisting of halide ion, inorganic acid ion, hydroxide ion and isothiocyanate ion; and
m is an integer of 0 to 6.

[4] The structural base described in [3], wherein the monomer mixture that is polymerized further includes a compound represented by the following formula (D) or (E):

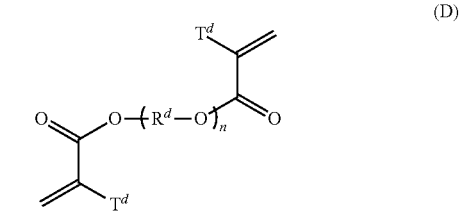
(D)

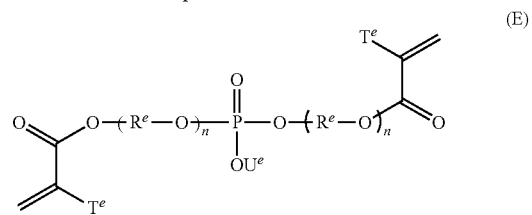
(E)

wherein
$T^d$, $T^e$ and $U^e$ are each independently a hydrogen atom or a $C_{1-5}$ linear or branched alkyl group;
$R^d$ and $R^e$ are each independently a $C_{1-10}$ linear or branched alkylene group which may be substituted with a halogen atom; and n is an integer of 1 to 6.

[5] The structural base described in any one of [1] to [4], wherein the structural base includes a structural portion composed of at least two flat faces adjacent to one another, the angle between each two of the flat faces being $0<\theta<180°$.

[6] The structural base described in any one of [1] to [5], wherein the coating film is a biomaterial adhesion inhibitory coating film.

[7] The structural base described in any one of [1] to [6], wherein the structural base is a cell culture vessel and/or an optical measurement base.

[8] The structural base described in any one of [1] to [7], wherein the surface of the structural base has a water contact angle in air of 0 to 120° or a bubble contact angle in water of 80 to 180°.

[9] A method for producing a structural base described in [1], comprising a step of applying a coating agent onto a structural base in one operation to form a coating film on at least a portion of the surface of the structural base, the difference between the maximum film thickness and the minimum film thickness of the coating film being not more than 1000 Å, the coating agent comprising a copolymer including a repeating unit containing a group represented by the following formula (a), and a repeating unit containing a group represented by the following formula (b):

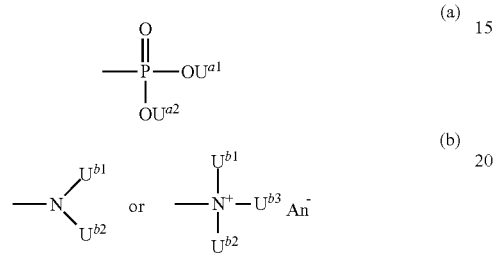

wherein $U^{a1}$, $U^{a2}$, $U^{b1}$, $U^{b2}$ and $U^{b3}$ are each independently a hydrogen atom or a $C_{1-5}$ linear or branched alkyl group, and An is an anion selected from the group consisting of halide ion, inorganic acid ion, hydroxide ion and isothiocyanate ion.

[10] The production method described in [9], wherein the copolymer includes repeating units represented by the following formulae (a1) and (b1):

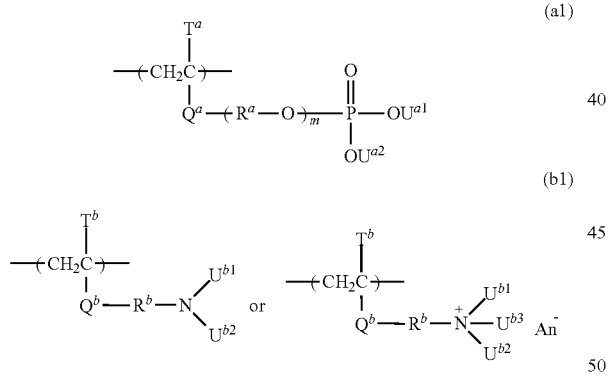

wherein $T^a$ and $T^b$ are each independently a hydrogen atom or a $C_{1-5}$ linear or branched alkyl group;

$Q^a$ and $Q^b$ are each independently a single bond, an ester bond or an amide bond;

$R^a$ and $R^b$ are each independently a $C_{1-10}$ linear or branched alkylene group which may be substituted with a halogen atom;

$U^{a1}$, $U^{a2}$, $U^{b1}$, $U^{b2}$ and $U^{b3}$ are each independently a hydrogen atom or a $C_{1-5}$ linear or branched alkyl group;

An⁻ is an anion selected from the group consisting of halide ion, inorganic acid ion, hydroxide ion and isothiocyanate ion; and m is an integer of 0 to 6.

[11] The production method described in [9] or [10], wherein the copolymer is one obtained by polymerizing a monomer mixture including compounds represented by the following formulae (A) and (B):

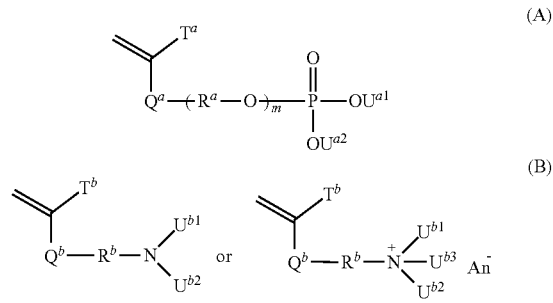

wherein $T^a$, $T^b$, $U^{a1}$, $U^{a2}$, $U^{b1}$, $U^{b2}$ and $U^{b3}$ are each independently a hydrogen atom or a $C_{1-5}$ linear or branched alkyl group;

$Q^a$ and $Q^b$ are each independently a single bond, an ester bond or an amide bond;

$R^a$ and $R^b$ are each independently a $C_{1-10}$ linear or branched alkylene group which may be substituted with a halogen atom;

An⁻ is an anion selected from the group consisting of halide ion, inorganic acid ion, hydroxide ion and isothiocyanate ion; and m is an integer of 0 to 6.

[12] The structural base described in [11], wherein the monomer mixture that is polymerized further includes a compound represented by the following formula (D) or (E):

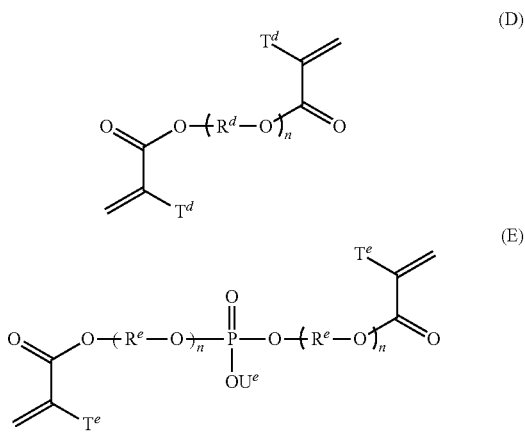

wherein $T^d$, $T^e$ and $U^e$ are each independently a hydrogen atom or a $C_{1-5}$ linear or branched alkyl group;

$R^d$ and $R^e$ are each independently a $C_{1-10}$ linear or branched alkylene group which may be substituted with a halogen atom; and n is an integer of 1 to 6.

[13] The production method described in any one of [9] to [12], wherein the structural base includes a structural portion composed of at least two flat faces adjacent to one another, the angle between each two of the flat faces being 0<θ<180°.

[14] The production method described in any one of [9] to [13], wherein the coating film is a biomaterial adhesion inhibitory coating film.

[15] The production method described in any one of [9] to [14], wherein the water contact angle in air of the surface of the structural base is 0 to 120°, or the bubble contact angle in water of the surface of the structural base is 80 to 180°.

[16] A method for forming a coating film on at least a portion of the surface of a structural base by application and drying operations alone, the difference between the maximum film thickness and the minimum film thickness of the coating film being not more than 1000 Å.

[17] The method described in [16], wherein the water contact angle in air of the surface of the structural base is 0 to 120° or the bubble contact angle in water of the surface of the structural base is 80 to 180°.

[18] The structural base described in any one of [1] to [7], wherein the surface of the coating film disposed on the structural base has a water contact angle in air of 0 to 120° or a bubble contact angle in water of 130 to 180°.

[19] The production method described in any one of [9] to [14], wherein the water contact angle in air of the surface of the coating film disposed on the structural base is 0 to 120°, or the bubble contact angle in water of the surface of the coating film disposed on the structural base is 130 to 180°.

[20] The method described in [16], wherein the water contact angle in air of the surface of the coating film disposed on the structural base is 0 to 120°, or the bubble contact angle in water of the surface of the coating film disposed on the structural base is 130 to 180°.

Advantageous Effects of Invention

A structural base of the present invention includes, on at least a portion of the surface thereof, a coating film which includes a polymer capable of inhibiting biomaterial adhesion, in particular, a copolymer including a specific anionic structure and a specific cationic structure. This coating film has a difference between the maximum film thickness and the minimum film thickness of not more than 1000 Å, or preferably not more than 300 Å. The coating film has an outstanding performance in inhibiting the adhesion of biomaterials. Further, the coating film can be formed by a simple operation onto various materials such as glass, metal-containing compounds, semimetal-containing compounds, active carbons and resins. In some cases, hydrophobic groups may be introduced into the copolymer. This introduction allows the copolymer to give coating films which can be firmly fixed to resins such as plastics and are more durable in contact with aqueous solvents after film production.

The structural base of the present invention may include a structural portion composed of at least two flat faces adjacent to one another, the angle between each two of the flat faces being 0<θ<180°. Even in this case, the coating film is a uniform and conformal coating which is not significantly thicker at the edge or bottom of the structural portion due to the coating agent having been accumulated there and which has a difference between the maximum film thickness and the minimum film thickness of not more than 1000 Å, or preferably not more than 300 Å. Thus, where the coating film is one capable of inhibiting biomaterial adhesion, for example, where the coating film includes a copolymer that includes a repeating unit containing a group represented by the aforementioned formula (a), and a repeating unit containing a group represented by the aforementioned formula (b), the structural base may be used in an application where the adhesion of biomaterials is not desired; for example, the structural base may be a cell culture vessel or, in particular, a microwell plate. A microwell plate that includes a uniform conformal coating film with a difference between the maximum film thickness and the minimum film thickness of not more than 1000 Å, or preferably not more than 300 Å is useful not only in that it has a sufficient resistance to biomaterial adhesion but also in that optical measurement is not adversely affected because the film thickness is below the measurement wavelength of general plate readers (for example, 340 to 850 nm).

DESCRIPTION OF EMBODIMENTS

Description of Terms

Figure 1:
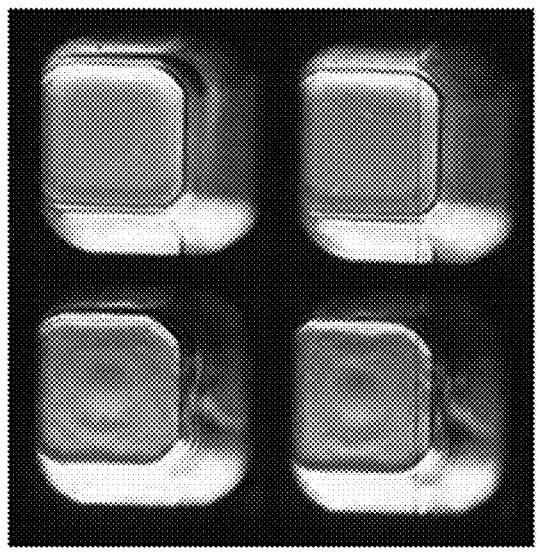
FIG. 1 is a picture, taken from above, of the inside of wells in a microwell plate having coating films obtained in Example 10/Comparative Example 6.

The terms used in the present invention have the following definitions unless otherwise specified.

In the present invention, the "halogen atom" means fluorine atom, chlorine atom, bromine atom or iodine atom.

In the present invention, the "alkyl group" means linear or branched, monovalent saturated aliphatic hydrocarbon group. Examples of the "$C_{1-5}$ linear or branched alkyl groups" include methyl group, ethyl group, n-propyl group, isopropyl group, n-butyl group, isobutyl group, s-butyl group, t-butyl group, n-pentyl group, 1-methylbutyl group, 2-methylbutyl group, 3-methylbutyl group, 1,1-dimethylpropyl group, 1,2-dimethylpropyl group, 2,2-dimethylpropyl group and 1-ethylpropyl group. Examples of the "$C_{1-18}$ linear or branched alkyl groups" include the $C_{1-5}$ linear or branched alkyl groups mentioned above, and further include hexyl group, heptyl group, octyl group, nonyl group, decyl group, undecyl group, dodecyl group, tridecyl group, tetradecyl group, pentadecyl group, hexadecyl group, heptadecyl group, octadecyl group, and isomers thereof. Similarly, examples of the "$C_{1-10}$ linear or branched alkyl groups" include the "$C_{1-5}$ linear or branched alkyl groups" mentioned above, and further include hexyl group, heptyl group, octyl group, nonyl group, decyl group, and isomers thereof.

In the present invention, the "$C_{1-5}$ linear or branched alkyl group which may be substituted with a halogen atom" means any of the above-mentioned $C_{1-5}$ linear or branched alkyl groups, or any of the above-mentioned $C_{1-5}$ linear or branched alkyl groups that is substituted with one or more of the above-mentioned halogen atoms. Examples of the "$C_{1-5}$ linear or branched alkyl groups" are as mentioned above. The "$C_{1-5}$ linear or branched alkyl group substituted with one or more halogen atoms" means any of the above-mentioned $C_{1-5}$ linear or branched alkyl groups that is substituted with a halogen atom in place of one or more hydrogen atoms, with examples including fluoromethyl group, difluoromethyl group, trifluoromethyl group, chloromethyl group, dichloromethyl group, trichloromethyl group, bromomethyl group, iodomethyl group, 2,2,2-trifluoroethyl group, 2,2,2-trichloroethyl group, perfluoroethyl group, perfluorobutyl group and perfluoropentyl group.

In the present invention, the "ester bond" means —C(=O)—O— or —O—C(=O)—, the "amide bond" means —NHC(=O)— or —C(=O)NH—, and the ether bond means —O—.

In the present invention, the "$C_{1-10}$ linear or branched alkylene group which may be substituted with a halogen atom" means a $C_{1-10}$ linear or branched alkylene group, or a $C_{1-10}$ linear or branched alkylene group substituted with one or more halogen atoms. Here, the "alkylene group" means a divalent organic group corresponding to the alkyl group described hereinabove. Examples of the "$C_{1-10}$ linear or branched alkylene groups" include methylene group, ethylene group, propylene group, trimethylene group, tetramethylene group, 1-methylpropylene group, 2-methylpropylene group, dimethylethylene group, ethylethylene group, pentamethylene group, 1-methyl-tetramethylene group, 2-methyl-tetramethylene group, 1,1-dimethyl-trimethylene group, 1,2-dimethyl-trimethylene group, 2,2-dimethyl-trimethylene group, 1-ethyl-trimethylene group, hexamethylene group, octamethylene group and decamethylene group. Of these, ethylene group, propylene group, octamethylene group and decamethylene group are preferable. $C_{1-5}$ linear or branched alkylene groups such as, for example, ethylene group, propylene group, trimethylene group and tetramethylene group are more preferable. Ethylene group and propylene group are particularly preferable. The "$C_{1-10}$ linear or branched alkylene group substituted with one or more halogen atoms" means any of the above-mentioned alkylene group that is substituted with a halogen atom in place of one or more hydrogen atoms, and, in particular, ethylene or propylene group substituted with a halogen atom in place of part or all of the hydrogen atoms are preferable.

In the present invention, the "$C_{3-10}$ cyclic hydrocarbon group" means a $C_{3-10}$ monocyclic or polycyclic, saturated or partially unsaturated, monovalent aliphatic hydrocarbon group. Of such groups, $C_{3-10}$ monocyclic or bicyclic, saturated monovalent aliphatic hydrocarbon groups are preferable, with examples including $C_{3-10}$ cycloalkyl groups such as cyclopropyl group, cyclobutyl group and cyclohexyl group, and $C_{4-10}$ bicycloalkyl groups such as bicyclo[3.2.1]octyl group, bornyl group and isobornyl group.

In the present invention, the "$C_{6-10}$ aryl group" means a $C_{6-10}$ monocyclic or polycyclic, monovalent aromatic hydrocarbon group, with examples including phenyl group, naphthyl group and anthryl group. The "$C_{6-10}$ aryl group" may be substituted with one or more of the above-mentioned "$C_{1-5}$ linear or branched alkyl groups which may be substituted with a halogen atom".

In the present invention, the "$C_{7-15}$ aralkyl group" means group —R—R' wherein R represents the "$C_{1-5}$ alkylene group" described hereinabove, and R' represents the "$C_{6-10}$ aryl group" described hereinabove, with examples including benzyl group, phenethyl group and «-methylbenzyl group. The aryl moiety of the "$C_{7-15}$ aralkyl group" may be substituted with one or more of the "$C_{1-5}$ linear or branched alkyl groups which may be substituted with a halogen atom" described hereinabove.

In the present invention, the "$C_{7-15}$ aryloxyalkyl group" means group —R—O—R' wherein R represents the "$C_{1-5}$ alkylene group" described hereinabove, and R' represents the "$C_{6-10}$ aryl group" described hereinabove, with examples including phenoxymethyl group, phenoxyethyl group and phenoxypropyl group. The aryl moiety of the "$C_{7-15}$ aryloxyalkyl group" may be substituted with one or more of the "$C_{1-5}$ linear or branched alkyl groups which may be substituted with a halogen atom" described hereinabove.

In the present invention, the "halide ion" means fluoride ion, chloride ion, bromide ion or iodide ion.

In the present invention, the "inorganic acid ion" means carbonate ion, sulfate ion, phosphate ion, hydrogenphosphate ion, dihydrogen phosphate ion, nitrate ion, perchlorate ion or borate ion.

The anion $An^-$ is preferably a halide ion, a sulfate ion, a phosphate ion, a hydroxide ion or an isothiocyanate ion, and particularly preferably a halide ion.

In the present invention, the (meth)acrylate compounds mean both acrylate compounds and methacrylate compounds. For example, (meth)acrylic acid means acrylic acid and methacrylic acid.

In the present invention, the biomaterials may be proteins, sugars, nucleic acids or cells, or combinations thereof. Examples of the proteins include fibrinogen, bovine serum albumin (BSA), human albumin, various globulins, β-lipoprotein, various antibodies (IgG, IgA, IgM), peroxidase, various complements, various lectins, fibronectin, lysozyme, von Willebrand factor (vWF), serum γ-globulin, pepsin, ovalbumin, insulin, histone, ribonuclease, collagen and cytochrome c. Examples of the sugars include glucose, galactose, mannose, fructose, heparin and hyaluronic acid. Examples of the nucleic acids include deoxyribonucleic acid (DNA) and ribonucleic acid (RNA). Examples of the cells include fibroblasts, bone marrow cells, B lymphocytes, T lymphocytes, neutrophils, red blood cells, platelets, macrophages, monocytes, bone cells, bone marrow cells, pericytes, dendritic cells, keratinocytes, fat cells, mesenchymal cells, epithelial cells, epidermal cells, endothelial cells, vascular endothelial cells, hepatic parenchymal cells, cartilage cells, cumulus cells, neural cells, glial cells, neurons, oligodendrocyte, microglia, astroglial cells, heart cells, esophagus cells, muscle cells (for example, smooth muscle cells and skeletal muscle cells), pancreatic beta cells, melanocytes, hematopoietic precursor cells, mononuclear cells, embryonic stem cells (ES cells), embryonic tumor cells, embryonic germline stem cells, induced pluripotent stem cells (iPS cells), neural stem cells, hematopoietic stem cells, mesenchymal stem cells, liver stem cells, pancreatic stem cells, muscle stem cells, germline stem cells, intestinal stem cells, cancer stem cells, hair follicle stem cells, megakaryocytes, CD34 positive spinal cord-derived megakaryocytes, and various cell lines (for example, HCT116, Huh7, HEK293 (human embryonic kidney cells), HeLa (human cervical cancer cell lines), HepG2 (human liver cancer cell lines), UT7/TPO (human leukemia cell lines), CHO (Chinese hamster ovary cell lines), MDCK, MDBK, BHK, C-33A, HT-29, AE-1, 3D9, Ns0/1, Jurkat, NIH3T3, PC12, S2, Sf9, Sf21, High Five, Vero). The coating films of the present invention are highly inhibitory to the adhesion of, in particular, cells and proteins.

DESCRIPTION OF INVENTION

The structural base of the present invention is not particularly limited as long as at least a portion of the surface thereof has a coating film which at least has a film thickness of not more than 1500 Å, preferably 10 to 1300 Å, more preferably 10 to 1100 Å, still more preferably 10 to 1000 Å, particularly preferably 10 to 500 Å, and most preferably 10 to 300 Å. It is preferable that the coating film be disposed on not less than 10% of the total surface area of the structural base, and the proportion is more preferably not less than 20%, still more preferably not less than 30%, particularly preferably not less than 40%, and most preferably not less than 50%. When, for example, the structural base is a plate, it is preferable that the coating film be disposed on not less than 10% of the total surface area of one side, and the proportion is more preferably not less than 30%, still more preferably not less than 50%, and most preferably not less than 80%.

In the coating film, the difference between the maximum film thickness and the minimum film thickness is not more than 1000 Å, preferably not more than 500 Å, more preferably not more than 400 Å, and still more preferably not more than 300 Å. The coating film is preferably a biomaterial adhesion inhibitory coating film that includes a polymer capable of inhibiting the adhesion of biomaterials.

The phrase "capable of inhibiting the adhesion of biomaterials" or "resistant to the adhesion of various biomaterials" means that when, for example, the biomaterial is fibroblasts, the relative absorbance (WST O. D. 450 nm) (%) in comparison with the absorbance in the absence of a coating film measured by the method described in Examples with an absorptiometer, ((Absorbance (WST O. D. 450 nm) in Example)/(Absorbance (WST O. D. 450 nm) in Comparative Example)), is not more than 9%, preferably not more than 6%, and more preferably not more than 3%.

The phrase "capable of inhibiting the adhesion of biomaterials" or "resistant to the adhesion of various biomaterials" means that when, for example, the biomaterial is a protein, the relative optical density (450 nm) (%) of a TMB solution in comparison with the optical density in the absence of a coating film measured by the method described in Examples, ((Optical density (450 nm) in Example)/(Optical density (450 nm) in Comparative Example)), is not more than 40%, preferably not more than 30%, more preferably not more than 20%, still more preferably not more than 10%, and even more preferably not more than 5%.

In the present specification, examples of the polymers capable of inhibiting the adhesion of biomaterials include polymers of ethylenically unsaturated monomers, and polysaccharides and derivatives thereof. Examples of the polymers of ethylenically unsaturated monomers include polymers of one, or two or more kinds of ethylenically unsaturated monomers selected from the group consisting of (meth)acrylic acid and esters thereof; vinyl acetate; vinylpyrrolidone; ethylene; vinyl alcohols; and hydrophilic functional derivatives thereof. Examples of the polysaccharides and derivatives thereof include cellulose polymers such as hydroxyalkylcelluloses (for example, hydroxyethylcellulose and hydroxypropylcellulose), starch, dextran and curdlan.

Examples of the hydrophilic functional groups in the hydrophilic functional derivatives include phosphoric acid, phosphonic acid, and ester structures of these acids; betaine structures; amide structures; alkylene glycol residues; amino groups; and sulfinyl groups.

Here, the phosphoric acid and ester structures thereof mean groups represented by the following formula:

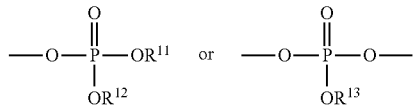

wherein $R^{11}$, $R^{12}$ and $R^{13}$ are each independently a hydrogen atom or an organic group (such as, for example, a $C_{1-5}$ linear or branched alkyl group). The phosphonic acid and ester structures thereof mean groups represented by the following formula:

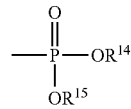

wherein $R^{14}$ and $R^{15}$ are each independently a hydrogen atom or an organic group (such as, for example, a $C_{1-5}$ linear or branched alkyl group). Examples of the ethylenically unsaturated monomers having such a structure include acid phosphoxyethyl (meth)acrylate and vinylphosphonic acid.

The betaine structures mean monovalent or divalent groups of compounds having an amphoteric center between a quaternary ammonium cation structure and an acid anionic structure, with examples including phosphorylcholine group:

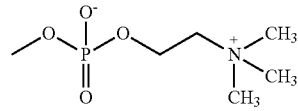

Examples of the ethylenically unsaturated monomers having such a structure include 2-methacryloyloxyethyl phosphorylcholine (MPC).

The amide structures mean groups represented by the following formula:

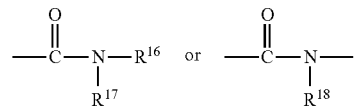

wherein $R^{16}$, $R^{17}$ and $R^{18}$ are each independently a hydrogen atom or an organic group (such as, for example, a methyl group, a hydroxymethyl group or a hydroxyethyl group). Examples of the ethylenically unsaturated monomers having such a structure include (meth)acrylamide and N-(hydroxymethyl) (meth)acrylamide. Further, monomers or polymers having such a structure are disclosed in, for example, Japanese Patent Application Kokai Publication No. 2010-169604.

The alkylene glycol residues mean alkyleneoxy groups (~Alk-O—) which remain after the hydroxyl group(s) at one or both ends of an alkylene glycol (HO-Alk-OH; wherein Alk is a $C_{1-10}$ alkylene group) has condensed with other compound. The residues also include poly(alkyleneoxy) groups having alkyleneoxy repeating units. Examples of the ethylenically unsaturated monomers having such a structure include 2-hydroxyethyl (meth)acrylate and methoxypolyethylene glycol (meth)acrylate. Further, monomers or polymers having such a structure are disclosed in, for example, Japanese Patent Application Kokai Publication No. 2008-533489.

The amino groups mean groups represented by the formula:—$NH_2$, —$NHR^{19}$ or —$NR^{20}R^{21}$ wherein $R^{19}$, $R^{20}$ and $R^{21}$ are each independently an organic group (such as, for example, a $C_{1-5}$ linear or branched alkyl group). The amino groups in the present specification include quaternarized or chlorinated amino groups. Examples of the ethylenically unsaturated monomers having such a structure include dimethylaminoethyl (meth)acrylate, 2-(t-butylamino)ethyl (meth)acrylate and methacryloylcholine chloride.

The sulfinyl groups mean groups represented by the following formula:

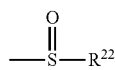

wherein $R^{22}$ is an organic group (such as, for example, a $C_{1-10}$ organic group, preferably a $C_{1-10}$ alkyl group having one or more hydroxyl groups). Examples of the polymers having such a structure include copolymers disclosed in Japanese Patent Application Kokai Publication No. 2014-48278.

In particular, the coating film provided on the structural base preferably includes a copolymer which includes a repeating unit containing a group represented by the following formula (a), and a repeating unit containing a group represented by the following formula (b):

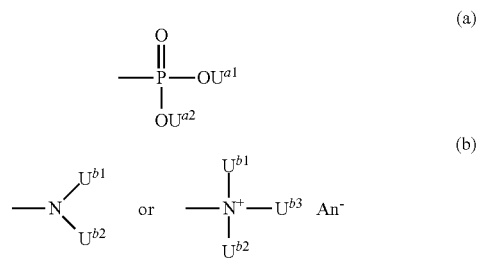

In the formulae, $U^{a1}$, $U^{a2}$, $U^{b1}$, $U^{b2}$ and $U^{b3}$ are each independently a hydrogen atom or a $C_{1-5}$ linear or branched alkyl group; and An is an anion selected from the group consisting of halide ion, inorganic acid ion, hydroxide ion and isothiocyanate ion.

The copolymer contained in the coating film may further include a repeating unit containing a group represented by the following formula (c):

wherein $R^c$ is a $C_{1-18}$ linear or branched alkyl group, a $C_{3-10}$ cyclic hydrocarbon group, a $C_{6-10}$ aryl group, a $C_{7-15}$ aralkyl group or a $C_{7-15}$ aryloxyalkyl group (wherein the aryl moiety may be substituted with a $C_{1-5}$ linear or branched alkyl group which may be substituted with a halogen atom).

The copolymer contained in the coating film is not particularly limited as long as the copolymer includes a repeating unit containing a group represented by the above formula (a), a repeating unit containing a group represented by the above formula (b), and optionally a repeating unit containing a group represented by the above formula (c). The repeating unit containing a group represented by the above formula (c) is different from the repeating unit containing a group represented by the above formula (a), and from the repeating unit containing a group represented by the above formula (b). The copolymer is preferably one obtained by the radical polymerization of a monomer containing a group represented by the above formula (a), a monomer containing a group represented by the above formula (b), and optionally a monomer containing a group represented by the above formula (c). Polymers obtained by polycondensation or polyaddition reaction may be also used. Examples of the copolymers include vinyl polymerized polymers obtained by the reaction of olefins, and also include polyamides, polyesters, polycarbonates and polyurethanes. Of these, vinyl polymerized polymers obtained by the reaction of olefins, or (meth)acrylate polymers obtained by the polymerization of (meth)acrylate compounds are preferable.

In the copolymer, the proportion of the repeating units containing a group represented by the formula (a) is 3 mol % to 80 mol %. The copolymer may include two or more kinds of repeating units containing a group represented by the formula (a).

In the copolymer, the proportion of the repeating units containing a group represented by the formula (b) is 3 mol % to 80 mol %. The copolymer may include two or more kinds of repeating units containing a group represented by the formula (b).

In the copolymer, the proportion of the repeating units containing a group represented by the formula (c) may be the balance after deduction of the units having the formulae (a) and (b) from the copolymer, and is, for example, 0 mol % to 90 mol %. The copolymer may include two or more kinds of repeating units containing a group represented by the formula (c).

In an embodiment of the copolymer contained in the coating film, the copolymer includes repeating units represented by the following formulae (a1) and (b1):

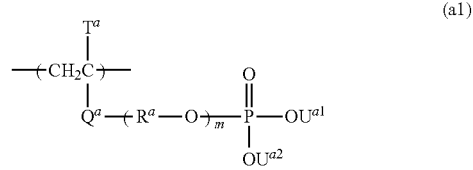

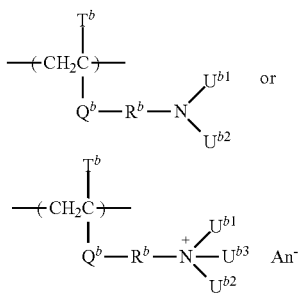

(b1)

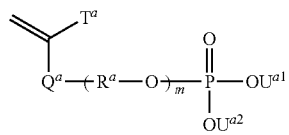

(A)

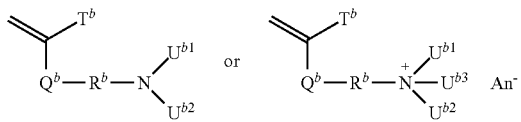

(B)

In the formulae, $T^a$ and $T^b$ are each independently a hydrogen atom or a $C_{1-5}$ linear or branched alkyl group, $Q^a$ and $Q^b$ are each independently a single bond, an ester bond or an amide bond, $R^a$ and $R^b$ are each independently a $C_{1-10}$ linear or branched alkylene group which may be substituted with a halogen atom, $U^{a1}$, $U^{a2}$, $U^{b1}$, $U^{b2}$ and $U^{b3}$ are each independently a hydrogen atom or a $C_{1-5}$ linear or branched alkyl group, An⁻ is an anion selected from the group consisting of halide ion, inorganic acid ion, hydroxide ion and isothiocyanate ion, and m is an integer of 0 to 6.

The copolymer may further include repeating units of the formula (c1) below:

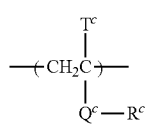

(c1)

In the formula, $T^c$ independently at each occurrence is a hydrogen atom or a $C_{1-5}$ linear or branched alkyl group, $Q^c$ is a single bond, an ether bond or an ester bond, and $R^c$ is a $C_{1-18}$ linear or branched alkyl group, a $C_{3-10}$ cyclic hydrocarbon group, a $C_{6-10}$ aryl group, a $C_{7-15}$ aralkyl group or a $C_{7-15}$ aryloxyalkyl group (wherein the aryl moiety may be substituted with a $C_{1-5}$ linear or branched alkyl group which may be substituted with a halogen atom).

In the formula (a1), m is an integer of 0 to 6, preferably an integer of 1 to 6, more preferably an integer of 1 to 5, and particularly preferably 1.

In the copolymer, the proportion of the repeating units represented by the formula (a1) is 3 mol % to 80 mol %. The copolymer may include two or more kinds of repeating units represented by the formula (a1).

In the copolymer, the proportion of the repeating units represented by the formula (b1) is 3 mol % to 80 mol %. The copolymer may include two or more kinds of repeating units represented by the formula (b1).

In the copolymer of the present invention, the proportion of the repeating units represented by the formula (c1) may be the balance after deduction of the units having the formulae (a1) and (b1) from the copolymer, and is, for example, 0 mol % to 90 mol %. The copolymer of the invention may include two or more kinds of repeating units represented by the formula (c1).

In another embodiment of the copolymer contained in the coating film, the copolymer is one obtained by reacting (polymerizing) in a solvent a monomer mixture including compounds represented by the following formulae (A) and (B):

wherein $T^a$ and $T^b$ are each independently a hydrogen atom or a $C_{1-5}$ linear or branched alkyl group;

$Q^a$ and $Q^b$ are each independently a single bond, an ester bond or an amide bond;

$R^a$ and $R^b$ are each independently a $C_{1-10}$ linear or branched alkylene group which may be substituted with a halogen atom;

$U^{a1}$, $U^{a2}$, $U^{b1}$, $U^{b2}$ and $U^{b3}$ are each independently a hydrogen atom or a $C_{1-5}$ linear or branched alkyl group;

An⁻ is an anion selected from the group consisting of halide ion, inorganic acid ion, hydroxide ion and isothiocyanate ion; and m is an integer of 0 to 6.

The monomer mixture that is polymerized may further include a compound represented by the following formula (C):

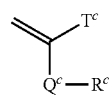

(C)

wherein $T^c$ independently at each occurrence is a hydrogen atom or a $C_{1-5}$ linear or branched alkyl group;

$Q^c$ is a single bond, an ether bond or an ester bond; and $R^c$ is a $C_{1-18}$ linear or branched alkyl group, a $C_{3-10}$ cyclic hydrocarbon group, a $C_{6-10}$ aryl group, a $C_{7-15}$ aralkyl group or a $C_{7-15}$ aryloxyalkyl group (wherein the aryl moiety may be substituted with a $C_{1-5}$ linear or branched alkyl group which may be substituted with a halogen atom).

$T^a$, $T^b$ and $T^c$ are preferably each a hydrogen atom, a methyl group or an ethyl group, and more preferably a hydrogen atom or a methyl group. $Q^a$, $Q^b$ and $Q^c$ are preferably each a single bond or an ester bond, and more preferably an ester bond. $R^a$ and $R^b$ are preferably each a $C_{1-5}$ linear or branched alkylene group, and more preferably a methylene group, an ethylene group or a propylene group. Reis preferably a $C_{4-18}$ linear or branched alkyl group or a $C_{3-10}$ cycloalkyl group, and more preferably a butyl, pentyl or hexyl group or an isomer thereof, or a cyclohexyl group. $U^{a1}$, $U^{a2}$, $U^{b1}$, $U^{b2}$ and $U^{b3}$ are preferably each a hydrogen atom, a methyl group, an ethyl group or a t-butyl group. $U^{a1}$ and $U^{a2}$ in the formula (a) are more preferably each a hydrogen atom, and $U^{b1}$, $U^{b2}$ and $U^{b3}$ in the formula (b) are more preferably each a hydrogen atom, a methyl group, an ethyl group or a t-butyl group.

Specific examples of the formula (A) described above include vinylphosphonic acid, acid phosphoxyethyl (meth)acrylate, 3-chloro-2-acid phosphoxypropyl (meth)acrylate, acid phosphoxypropyl (meth)acrylate, acid phosphoxymethyl (meth)acrylate, acid phosphoxypolyoxyethylene glycol mono(meth)acrylate and acid phosphoxypolyoxypropylene glycol mono(meth)acrylate. Of these, vinylphosphonic acid, acid phosphoxyethyl methacrylate (=2-(methacryloyloxy)ethyl phosphate) and acid phosphoxypolyoxyethylene glycol monomethacrylate are preferably used, and acid phosphoxyethyl methacrylate (=2-(methacryloyloxy)ethyl phosphate) is most preferable.

The structures of vinylphosphonic acid, acid phosphoxyethyl methacrylate (=2-(methacryloyloxy)ethyl phosphate), acid phosphoxypolyoxyethylene glycol monomethacrylate and acid phosphoxypolyoxypropylene glycol monomethacrylate are represented by the following formulae (A-1) to (A-4), respectively.

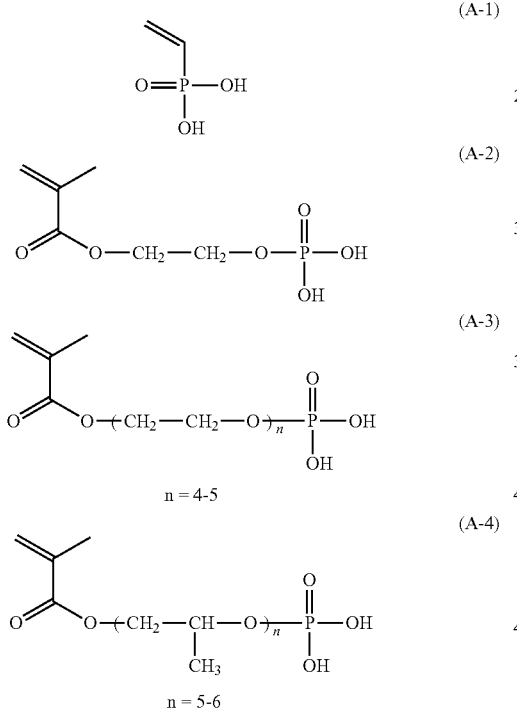

These compounds sometimes contain (meth)acrylate compounds with two functional groups of the general formula (D) or (E) described later which are formed during the synthesis.

Specific examples of the formula (B) described above include dimethylaminoethyl (meth)acrylate, diethylaminoethyl (meth)acrylate, dimethylaminopropyl (meth)acrylate, 2-(t-butylamino)ethyl (meth)acrylate and methacryloylcholine chloride. Of these, dimethylaminoethyl (meth)acrylate, methacryloylcholine chloride and 2-(t-butylamino)ethyl (meth)acrylate are preferably used, and dimethylaminoethyl (meth)acrylate is most preferably used.

The structures of dimethylaminoethyl acrylate (=acrylic acid 2-(dimethylamino)ethyl), diethylaminoethyl methacrylate (=methacrylic acid 2-(diethylamino)ethyl), dimethylaminoethyl methacrylate (=methacrylic acid 2-(dimethylamino)ethyl), methacryloylcholine chloride and 2-(t-butylamino)ethyl methacrylate (=methacrylic acid 2-(t-butylamino)ethyl) are represented by the following formulae (B-1) to (B-5), respectively.

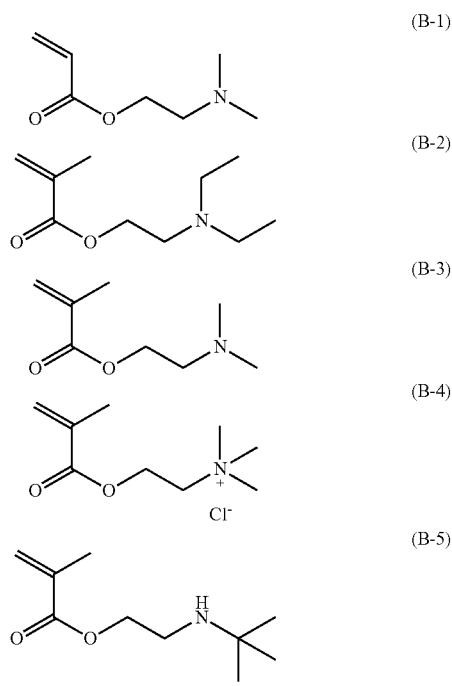

Specific examples of the formula (C) described above include linear or branched alkyl esters of (meth)acrylic acid such as butyl (meth)acrylate, 2-ethylhexyl (meth)acrylate, lauryl (meth)acrylate and stearyl (meth)acrylate; cyclic alkyl esters of (meth)acrylic acid such as cyclohexyl (meth)acrylate and isobornyl (meth)acrylate; aralkyl esters of (meth)acrylic acid such as benzyl (meth)acrylate and phenethyl (meth)acrylate; styrene monomers such as styrene, methylstyrene and chloromethylstyrene; vinyl ether monomers such as methyl vinyl ether and butyl vinyl ether; and vinyl ester monomers such as vinyl acetate and vinyl propionate. Of these, butyl (meth)acrylate and cyclohexyl (meth)acrylate are preferably used.

The structures of butyl methacrylate (=methacrylic acid butyl) and cyclohexyl methacrylate (=methacrylic acid cyclohexyl) are represented by the following formulae (C-1) and (C-2), respectively.

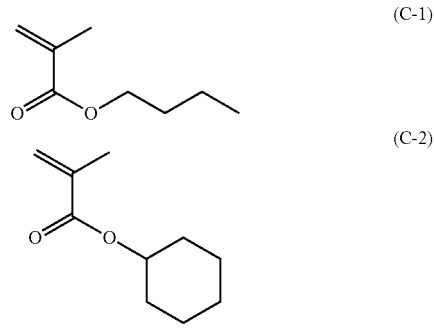

In another embodiment of the copolymer contained in the coating film, the copolymer may further include a desired fourth component in addition to the compounds represented by the formulae (A) and (B) and the optional compound of the formula (C). For example, the copolymer may be such that a (meth)acrylate compound having two or more functional groups is copolymerized as a fourth component, and part of the polymer is partially three-dimensionally cross-linked. Examples of such fourth components include bifunctional monomers represented by the following formula (D) or (E):

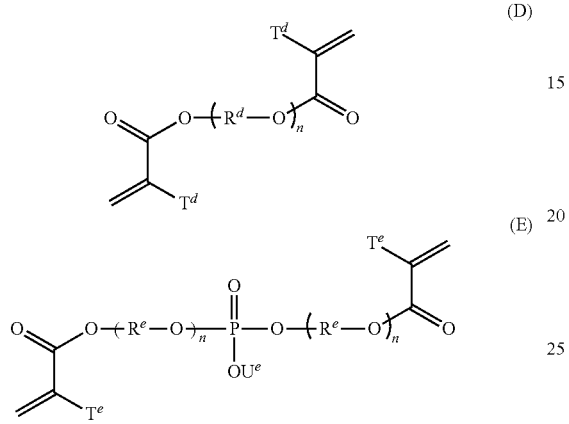

wherein $T^d$, $T^e$ and $U^e$ are each independently a hydrogen atom or a $C_{1-5}$ linear or branched alkyl group, $R^d$ and $R^e$ are each independently a $C_{1-10}$ linear or branched alkylene group which may be substituted with a halogen atom; and n is an integer of 1 to 6. That is, the copolymer according to the present invention preferably includes a crosslinked structure derived from such a bifunctional monomer.

In the formulae (D) and (E), $T^d$ and $T^e$ are preferably each independently a hydrogen atom, a methyl group or an ethyl group, and more preferably each independently a hydrogen atom or a methyl group.

In the formula (E), $U^e$ is preferably a hydrogen atom, a methyl group or an ethyl group, and more preferably a hydrogen atom.

In the formula (D), $R^d$ is preferably a $C_{1-3}$ linear or branched alkylene group which may be substituted with a halogen atom, and is more preferably independently at each occurrence an ethylene or propylene group or an ethylene or propylene group substituted with one chlorine atom, and is particularly preferably an ethylene group or a propylene group. In the formula (D), n is preferably an integer of 1 to 5, and particularly preferably 1.

In the formula (E), $R^e$ is preferably a $C_{1-3}$ linear or branched alkylene group which may be substituted with a halogen atom, and is more preferably independently at each occurrence an ethylene or propylene group or an ethylene or propylene group substituted with one chlorine atom, and is particularly preferably an ethylene group or a propylene group. In the formula (E), n is preferably an integer of 1 to 5, and particularly preferably 1.

Some preferred bifunctional monomers represented by the formula (D) are ethylene glycol di(meth)acrylate, triethylene glycol di(meth)acrylate, propylene glycol di(meth)acrylate, and bifunctional monomers derived from the above formula (A-3) or (A-4).

Some preferred bifunctional monomers represented by the formula (E) are bis(methacryloyloxymethyl) phosphate, bis[(2-methacryloyloxy)ethyl] phosphate, bis[3-(methacryloyloxy)propyl] phosphate, and bifunctional monomers derived from the above formula (A-3) or (A-4).

An example trifunctional (meth)acrylate compound is phosphinylidine tris(oxy-2,1-ethanediyl) triacrylate.

Particularly preferred fourth components are ethylene glycol dimethacrylate, dimethacrylates which are bifunctional monomers derived from the formula (A-3) or (A-4) and have ethylene glycol or propylene glycol repeating units, bis[2-(methacryloyloxy)ethyl] phosphate, and dimethacrylates which are bifunctional monomers derived from the formula (A-3) or (A-4) and have ethylene glycol or propylene glycol repeating units via a phosphate group. The structures of these monomers are represented by the following formulae (D-1) to (D-3) and (E-1) to (E-3), respectively.

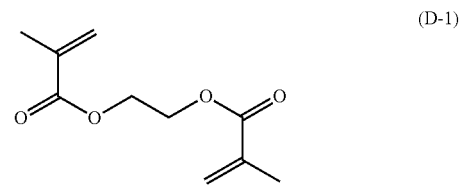

(D-1)

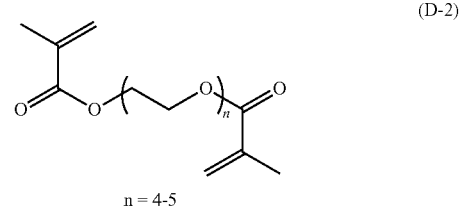

(D-2)

n = 4-5

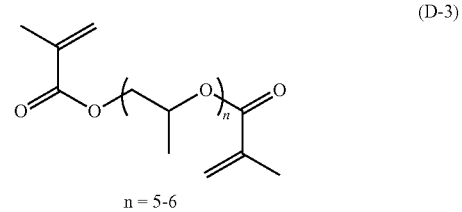

(D-3)

n = 5-6

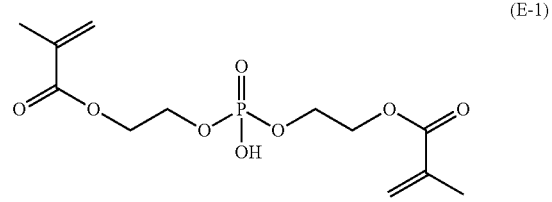

(E-1)

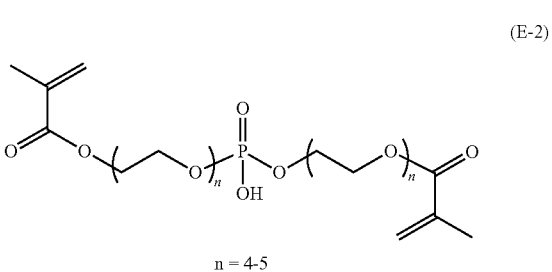

(E-2)

n = 4-5

(E-3)

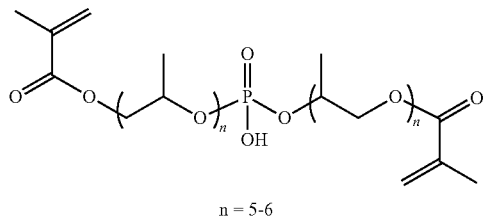

n = 5-6

The copolymer may include one, or two or more kinds of fourth components.

In the copolymer, the proportion of the crosslinked structure derived from the fourth component, for example, a bifunctional monomer represented by the formula (D) or (E), is 0 mol % to 50 mol %, preferably 5 mol % to 45 mol %, and most preferably 10 mol % to 40 mol %.

The proportion of the compound of the formula (A) relative to all the monomers forming the copolymer is 3 mol % to 80 mol %. The copolymer may include two or more kinds of compounds represented by the formula (A).

The proportion of the compound of the formula (B) relative to all the monomers forming the copolymer is 3 mol % to 80 mol %. The copolymer may include two or more kinds of compounds represented by the formula (B).

The proportion of the compound of the formula (C) relative to all the monomers forming the copolymer may be the balance after deduction of the proportions of the compounds of the formulae (A) and (B), and is, for example, 0 mol % to 90 mol %. The copolymer may include two or more kinds of compounds represented by the formula (C).

The copolymer that is contained in the coating film may be synthesized by a method generally adopted for the synthesis of polymers such as acrylic polymers or methacrylic polymers, with examples including radical polymerization, anionic polymerization and cationic polymerization. The polymerization may be performed in various forms such as solution polymerization, suspension polymerization, emulsion polymerization and bulk polymerization.

The solvent used in the polymerization reaction may be water, phosphate buffered solution, alcohol such as ethanol, or a mixture of these solvents, and desirably includes water or ethanol. It is preferable that the solvent include 10 mass % to 100 mass % water or ethanol. It is more preferable that the solvent include 50 mass % to 100 mass % water or ethanol. It is still more preferable that the solvent include 80 mass % to 100 mass % water or ethanol. It is furthermore preferable that the solvent include 90 mass % to 100 mass % water or ethanol. Preferably, the total of water and ethanol is 100 mass % of the solvent.

Regarding the reaction concentration, for example, the concentration of the compounds represented by the formula (A) or (B) in the reaction solvent is preferably controlled to 0.01 mass % to 4 mass %. If the concentration is above 4 mass %, for example, the copolymer may be gelled in the reaction solvent due to the strong associative properties of the phosphate groups in the compound of the formula (A). If the concentration is below 0.01 mass %, the varnish that is obtained has such a low concentration that it is difficult to prepare a coating agent which can form a coating film with a sufficient film thickness. The concentration is more preferably 0.01 mass % to 3 mass %, for example, 3 mass %, 2 mass % or 1 mass %.

The synthesis of the copolymer to be contained in the coating film may be start with, for example, forming a salt described in the formula (1) below and polymerizing it optionally together with a compound represented by the formula (C) to give a copolymer.

(1)

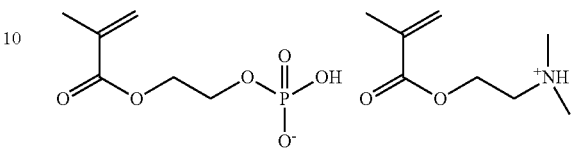

Because the phosphate group-containing monomer is associated easily, it may be added dropwise in small portions to the reaction solvent so that the monomer can be rapidly dispersed after its dropping to the reaction system.

The reaction solvent may be heated (for example, 40° C. to 100° C.) to increase the solubility of the monomers and the polymer.

To allow the polymerization reaction to proceed efficiently, it is preferable to use a polymerization initiator. Examples of the polymerization initiators include 2,2'-azobis(isobutyronitrile), 2,2'-azobis(2-methylbutyronitrile), 2,2'-azobis(2,4-dimethylvaleronitrile) (VA-065 manufactured by Wako Pure Chemical Industries, Ltd., 10 hour half-life temperature: 51° C.), 4,4'-azobis(4-cyanovaleric acid), 2,2'-azobis(4-methoxy-2,4-dimethylvaleronitrile), 1,1'-azobis(cyclohexane-1-carbonitrile), 1-[(1-cyano-1-methylethyl)azo]formamide, 2,2'-azobis[2-(2-imidazolin-2-yl)propane], 2,2'-azobis(2-methylpropionamidine) dihydrochloride, 2,2'-azobis[2-methyl-N-(2-hydroxyethyl)propionamide] (VA-086 manufactured by Wako Pure Chemical Industries, Ltd., 10 hour half-life temperature: 86° C.), benzoyl peroxide (BPO), 2,2'-azobis[N-(2-carboxyethyl)-2-methylpropionamidine] n-hydrate (VA-057 manufactured by Wako Pure Chemical Industries, Ltd., 10 hour half-life temperature: 57° C.), 4,4'-azobis(4-cyanopentanoic acid) (V-501 manufactured by Wako Pure Chemical Industries, Ltd.), 2,2'-azobis[2-(2-imidazolin-2-yl)propane] dihydrochloride (VA-044 manufactured by Wako Pure Chemical Industries, Ltd., 10 hour half-life temperature: 44° C.), 2,2'-azobis[2-(2-imidazolin-2-yl)propane] disulfate dihydrate (VA-046B manufactured by Wako Pure Chemical Industries, Ltd., 10 hour half-life temperature: 46° C.), 2,2'-azobis[2-(2-imidazolin-2-yl)propane] (VA-061 manufactured by Wako Pure Chemical Industries, Ltd., 10 hour half-life temperature: 61° C.), 2,2'-azobis(2-amidinopropane) dihydrochloride (V-50 manufactured by Wako Pure Chemical Industries, Ltd., 10 hour half-life temperature: 56° C.), peroxodisulfuric acid and t-butyl hydroperoxide.

In light of solubility in water, ion balance and interaction with the monomers, it is preferable that the initiator be selected from 2,2'-azobis[2-methyl-N-(2-hydroxyethyl)propionamide], 2,2'-azobis(N-(2-carboxyethyl)-2-methylpropionamidine) n-hydrate, 4,4'-azobis(4-cyanopentanoic acid), 2,2'-azobis[2-(2-imidazolin-2-yl)propane] dihydrochloride, 2,2'-azobis[2-(2-imidazolin-2-yl)propane] disulfate dihydrate, 2,2'-azobis[2-(2-imidazolin-2-yl)propane], 2,2'-azobis(2-amidinopropane) dihydrochloride and peroxodisulfuric acid.

In light of solubility in organic solvents, ion balance and interaction with the monomers, it is preferable to use 2,2'-azobis(2,4-dimethylvaleronitrile) or 2,2'-azobis(isobutyronitrile).

The polymerization initiator may be added in an amount of 0.05 mass % to 10 mass % relative to the total weight of the monomers used in the polymerization.

The polymerization reaction may be performed in such a manner that the reaction vessel is heated to 50° C. to 200° C. in an oil bath or the like, and stirring is performed for 1 hour to 48 hours, or more preferably the reaction vessel is heated to 80° C. to 150° C., and stirring is performed for 5 hours to 30 hours. Under such reaction conditions, the copolymer of the invention can be obtained. The reaction atmosphere is preferably a nitrogen atmosphere.

Regarding the reaction procedure, all the raw materials may be added to the reaction solvent at room temperature and may be thereafter polymerized while performing heating at the above temperature. Alternatively, a mixture of the raw materials may be added at once or dropwise in small portions to the solvent that has been heated.

When the latter reaction procedure is adopted, the copolymer of the present invention may be prepared by a production method which includes a step in which a mixture including the compounds of the above-described formulae (A), (B) and optionally (C), a solvent and a polymerization initiator is added dropwise to a solvent kept at a temperature higher than the 10 hour half-life temperature of the polymerization initiator, and the compounds are reacted (polymerized).

The molecular weight of the copolymer that is contained in the coating film may be about several thousand to several million, preferably 5,000 to 5,000,000, more preferably 5,000 to 2,000,000, and still more preferably 5,000 to 1,000,000. The copolymer may be a random copolymer, a block copolymer or a graft copolymer. The copolymerization reaction for producing the copolymer is not limited, and a known synthesis process performed in a solution such as polymerization utilizing radical polymerization, ion polymerization, photopolymerization or emulsion polymerization may be used. The copolymers according to the present invention may be used singly in accordance with the purpose, or a plurality of copolymers may be mixed in a ratio which may be changed appropriately in accordance with the purpose.

The coating agent used to form the coating film may be prepared by diluting the desired copolymer to a predetermined concentration with an appropriate solvent as required. Examples of the solvents include water, phosphate buffered saline (PBS) and alcohols. Examples of the alcohols include $C_{2-6}$ alcohols such as ethanol, propanol, isopropanol, 1-butanol, 2-butanol, isobutanol, t-butanol, 1-pentanol, 2-pentanol, 3-pentanol, 1-heptanol, 2-heptanol, 2,2-dimethyl-1-propanol (=neopentyl alcohol), 2-methyl-1-propanol, 2-methyl-1-butanol, 2-methyl-2-butanol (=t-amyl alcohol), 3-methyl-1-butanol, 3-methyl-3-pentanol, cyclopentanol, 1-hexanol, 2-hexanol, 3-hexanol, 2,3-dimethyl-2-butanol, 3,3-dimethyl-1-butanol, 3,3-dimethyl-2-butanol, 2-ethyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 4-methyl-3-pentanol and cyclohexanol. The solvents may be used singly, or may be combined into a mixed solvent. From the point of view of the dissolution of the copolymer, it is preferable that the solvent be selected from water, PBS, ethanol, propanol, and mixed solvents thereof, and more preferably selected from water, ethanol, and a mixed solvent thereof.

The coating agent may be prepared from a varnish containing the copolymer. The varnish containing the copolymer may be prepared by, for example, a production method which includes a step in which the compounds represented by the formulae (A), (B) and (C) are reacted (polymerized) in a solvent at a total concentration of the compounds of 0.01 mass % to 20 mass %.

To form the coating film uniformly, the solid concentration in the coating agent is preferably 0.01 to 50 mass %. The concentration of the copolymer in the coating agent is preferably 0.01 to 4 mass %, more preferably 0.01 to 3 mass %, particularly preferably 0.01 to 2 mass %, and further preferably 0.01 to 1 mass %. If the concentration of the copolymer is below 0.01 mass %, the coating agent is too low in copolymer concentration and fails to form a coating film with a sufficient film thickness. If the concentration is above 4 mass %, the storage stability of the coating agent is deteriorated and there is a risk that the solutes may be precipitated or the coating agent may be gelled.

In addition to the copolymer and the solvent, the coating agent may include other materials as required without impairing the performance of the coating films that are obtained. Examples of such additional materials include preservatives, surfactants, primers for enhancing the fixing to the substrate, antifungal agents and sugars.

To control the ion balance of the copolymer in the coating agent, a step may be added in which the pH of the coating agent is adjusted beforehand. The pH may be adjusted by, for example, adding a pH adjuster to a composition including the copolymer and a solvent to control the pH of the composition to 3.5 to 8.5, or more preferably 4.0 to 8.0. The type and amount of the pH adjuster may be selected appropriately in accordance with factors such as the concentration of the copolymer and the ratio of anions and cations.

Examples of the pH adjusters include organic amines such as ammonia, diethanolamine, pyridine, N-methyl-D-glucamine and tris(hydroxymethyl)aminomethane; alkali metal hydroxides such as potassium hydroxide and sodium hydroxide; alkali metal halides such as potassium chloride and sodium chloride; inorganic acids such as sulfuric acid, phosphoric acid, hydrochloric acid and carbonic acid, and alkali metal salts thereof; quaternary ammonium cations such as choline; and mixtures thereof (for example, buffers such as phosphate buffered physiological saline). Of these, ammonia, diethanolamine, sodium hydroxide, choline, N-methyl-D-glucamine and tris(hydroxymethyl)aminomethane are preferable, and ammonia, diethanolamine, sodium hydroxide and choline are particularly preferable.

The structural base of the present invention has, on at least a portion of the surface thereof, a coating film with a difference between the maximum film thickness and the minimum film thickness of not more than 1000 Å.

The structural base may include a structural portion composed of at least two flat faces adjacent to one another, the angle θ between each two of the flat faces being 0<θ<180°, preferably 30°<θ<150°, and particularly preferably 70°<θ<110°. Part or the entirety of either or both of the flat faces may be curved. If a structural base having such a structural portion is coated by the conventional technique, the coating agent disadvantageously accumulates at the edge or bottom having the angle θ. The coating film of the invention can avoid such problems particularly by virtue of its containing a copolymer which includes repeating units containing a group represented by the formula (a), repeating units containing a group represented by the formula (b), and optionally repeating units containing a group represented by the formula (c).

The structural bases may be typically experimental equipment, analytical equipment or medical equipment. The structural base may be the whole or at least a portion of, in particular, experimental equipment, analytical equipment or medical equipment each used in contact with biological tissues or blood. Examples of the experimental equipment include those generally used for the culturing of cells, including dishes/petri dishes such as petri dishes and culture dishes, flasks such as culture flasks and spinner flasks, plastic bags such as culture bags and Teflon (registered trademark) bags, multiwell plates such as multidishes/multiplates, microplates/microwell plates and deep-well plates, glass slides and related products such as chamber slides, tubes such as culture tubes, centrifuge tubes and microtubes, and culture vessels such as trays and roller bottles. Some preferred experimental equipment is 6-1536 well multiwell plates and dishes/petri dishes. Here, the shape of each well of the multiwell plates may be, for example, substantially hemispherical, substantially rectangular or substantially columnar, and the bottom of the well may be flat or rounded. When, for example, the wells are each substantially rectangular or substantially columnar, the phrase "at least two flat faces adjacent to one another" indicates the inner surface of the bottom and the inner surface of the wall of each well, and the "angle θ between each two of the flat faces" means the angle formed by the inner surface of the bottom and the inner surface of the wall of each well. When the bottom is rounded, the "inner surface of the bottom" will be understood as the tangent plane at the deepest portion of the round bottom. When each well is substantially hemispherical, the "at least two flat faces adjacent to one another" will indicate the tangent plane at the deepest portion of the bottom of the hemispherical well, and the tangent plane at the middle point of the arc between the deepest portion of the bottom to the edge, and the "angle θ between each two of the flat faces" means the angle formed by the two tangent planes.

Examples of the medical equipment include the entirety or at least a portion of structures such as implantable artificial organs and therapeutic devices, extracorporeal circulation type artificial organs, catheters, tubes, artificial valves, stents and artificial joints.

When, in particular, the structural base is one for optical measurement, any base (substrate) designed for optical measurement may be used without limitation. Examples of such structural bases include those mentioned above which are subjected to optical measurement (at wavelengths of, for example, 340 to 850 nm), bases (substrates) used for plate readers (such as cell culture plates), phase-contrast microscope plates, UV measurement cells, and transparent electrodes (ITO electrodes).

Examples of the materials of the structural bases include glass, metals, metal-containing compounds, semimetal-containing compounds, active carbon and resins. Examples of the metals include typical metals: (alkali metals: Li, Na, K, Rb, Cs; alkaline earth metals: Ca, Sr, Ba, Ra), magnesium group elements: Be, Mg, Zn, Cd, Hg; aluminum group elements: Al, Ga, In; rare earth elements: Y, La, Ce, Pr, Nd, Sm, Eu; tin group elements: Ti, Zr, Sn, Hf, Pb, Th; iron group elements: Fe, Co, Ni; earth-acid elements: V, Nb, Ta, chromium group elements: Cr, Mo, W, U; manganese group elements: Mn, Re; noble metals: Cu, Ag, Au; and platinum group elements: Ru, Rh, Pd, Os, Ir, Pt. Examples of the metal-containing compounds and the semimetal-containing compounds include ceramics which are basically metal oxides in the solid form sintered by heat treatment at a high temperature, semiconductors such as silicon, inorganic solid materials such as shaped products of inorganic compounds such as metal oxides or semimetal oxides (for example, silicon oxide and alumina), metal carbides or semimetal carbides, metal nitrides or semimetal nitrides (for example, silicon nitride), and metal borides or semimetal borides, aluminum, nickel-titanium, and stainless steel (for example, SUS304, SUS316 and SUS316L).

The resins as materials of the structural bases may be natural resins or derivatives thereof, or synthetic resins. Some preferred natural resins and derivatives thereof are cellulose, cellulose triacetate (CTA), nitrocellulose (NC) and dextran sulfate immobilized celluloses. Some preferred synthetic resins are polyacrylonitrile (PAN), polyester-based polymer alloy (PEPA), polystyrene (PS), polysulfone (PSF), polyethylene terephthalate (PET), polymethyl methacrylate (PMMA), polyvinyl alcohol (PVA), polyurethane (PU), ethylene vinyl alcohol (EVAL), polyethylene (PE), polyester, polypropylene (PP), polyvinylidene fluoride (PVDF), polyethersulfone (PES), polycarbonate (PC), polyvinyl chloride (PVC), polytetrafluoroethylene (PTFE), ultrahigh molecular weight polyethylene (UHPE), polydimethylsiloxane (PDMS), acrylonitrile-butadiene-styrene resin (ABS), Teflon (registered trademark), nylon, polymethylpentene (PMP) and various ion exchange resins.

In the structural base, the surface that is coated with the coating film may be composed of a single material or a combination of two or more materials. Of the materials mentioned above, glass, silicon, silicon oxide, polystyrene (PS), polypropylene (PP), Teflon (registered trademark), cycloolefin polymer (COP), polydimethylsiloxane (PDMS) alone, or stainless steel (such as SUS304, SUS316 or SUS316L), or a combination thereof is preferable. Because the coating film of the present invention can be formed by low temperature drying, application is possible to bases having low heat resistance such as resins.

The bases for the structural bases are used as such or after being washed with water or an appropriate medium, or after surface treatment such as plasma treatment.

Another aspect of the present invention resides in a method for producing a structural base having, on at least a portion of the surface thereof, a coating film having a difference between the maximum film thickness and the minimum film thickness of not more than 1000 Å. This method includes a step of applying the coating agent described hereinabove onto a structural base in one operation to form a coating film on at least a portion of the surface of the structural base, the difference between the maximum film thickness and the minimum film thickness of the coating film being not more than 1000 Å. The phrase "in one operation" means that the coating agent of the present invention is applied only one time to the structural base of the invention. The coating agent may be appropriately applied to the structural base by a known technique without limitation. The term "apply" also comprehends, for example, that the structural base is soaked into the coating agent, or that the coating agent is poured to a portion of the structural base having the angle θ and is allowed to stand for a predetermined time. The time and temperature for the soaking or standing may be selected appropriately in accordance with the material of the structural base and the type of the coating agent. For example, the soaking or standing is performed at 10 to 35° C., preferably ambient temperature (for example, 25° C.) for 30 seconds to 24 hours, preferably 1 minute to 3 hours. In the manner described above, a structural base can be produced which has a coating film on at least a portion, or preferably over the entirety, of the surface of the structural base.

While the structural base obtained by the above method can be used without post treatments (for example, a drying step), the coating film on the surface of the structural base may be preferably subjected to a drying step after the application step, and may be preferably further washed with water or an appropriate medium.

The drying step is carried out under atmospheric pressure or under vacuum, preferably at a temperature in the range of −200° C. to 200° C. The drying step removes the solvent in the coating agent, and causes the copolymer contained in the coating film to form ion bonds between the formula (a) and the formula (b), resulting in complete fixing to the base.

The coating film may be formed by drying at, for example, room temperature (10° C. to 35° C., for example, 25° C.). To promote the formation of the coating film, drying may be performed at, for example, 40° C. to 50° C. The drying step may be performed by a freeze drying method at a very low or low temperature (about −200° C. to −30° C.). Freeze drying is also called vacuum freeze drying, and is usually performed by freezing a wet product with a refrigerant and removing the solvent by sublimation under vacuum. Some example refrigerants generally used in the freeze drying are a mixed medium of dry ice and methanol (−78° C.), and liquid nitrogen (−196° C.).

If the drying temperature is below −200° C., a special refrigerant is needed and the treatment lacks versatility, and also such drying takes a long time for the sublimation of the solvent and thus is not efficient. If the drying temperature is above 200° C., the ion bonding reaction on the surface of the coating film proceeds too far, and the surface loses hydrophilicity and comes to exhibit no resistance to biomaterial adhesion. The drying temperature is more preferably 10° C. to 180° C., still more preferably 25° C. to 150° C., and most preferably 40° C. to 80° C.

To remove undesired components such as impurities and unreacted monomers remaining in the coating film, and to adjust the ion balance of the copolymer in the coating film, a step may be performed in which the coating film is washed with at least one solvent selected from water and aqueous electrolyte solutions. For example, the washing is preferably performed under running or ultrasonication of the solvent. The water and the aqueous electrolyte solutions may be heated beforehand in the range of, for example, 40° C. to 95° C. Some preferred aqueous electrolyte solutions are PBS, physiological saline (containing only sodium chloride), Dulbecco's phosphate buffered physiological saline, Tris buffered physiological saline, HEPES buffered physiological saline and Veronal buffered physiological saline, with PBS being particularly preferable. After being formed, the coating film remains strongly adhering to the base without leaching even when washed with water, PBS, alcohol or the like. Preferably, even when a biomaterial has become adhered to the coating, the film can be easily cleaned by water washing or the like and the surface of the structural base having the coating film exhibits resistance to biomaterial adhesion.

In the case where the coating agent is applied to at least a portion of the surface of the structural base and thereafter no drying step is performed, the structural base may be subjected to actual use directly or after being washed with, for example, water or an appropriate medium such as an aqueous electrolyte solution, within not more than 48 hours, preferably not more than 24 hours, more preferably not more than 12 hours, still more preferably not more than 6 hours, even more preferably not more than 3 hours, or further preferably not more than 1 hour after the application step. The washing conditions are the same as in the washing step performed after the drying step.

The surface of the structural base that is used in the invention has a water contact angle in air of 0 to 120°, preferably 50 to 115°, and more preferably 60 to 115°, or has a bubble contact angle in water of 80 to 180°, preferably 80 to 180°, more preferably 80 to 170°, and particularly preferably 80 to 160°. The water contact angle is evaluated based on, for example, the static contact angle described in Examples.

The surface of the structural base that has been provided with the coating film of the invention has sufficient resistance to biomaterial adhesion and exhibits hydrophilicity. The hydrophilicity is evaluated based on, for example, the static contact angle described in Examples. The surface of the structural base of the present invention has a water contact angle in air of 0 to 120°, preferably 10 to 110°, and more preferably 20 to 110°, or has a bubble contact angle in water of 130 to 180°, preferably 140 to 170°, more preferably 145 to 160°, and particularly preferably 149 to 159°.

EXAMPLES

Hereinbelow, the present invention will be described in greater detail based on discussions such as Synthetic Examples, Examples and Test Examples. However, it should be construed that the scope of the invention is not limited thereto.

The weight average molecular weight of copolymers shown in Synthetic Examples below is the results measured by gel filtration chromatography (hereinafter, abbreviated as GFC). The details such as measurement conditions are described below.

Device: Prominence (manufactured by Shimadzu Corporation)
GFC columns: TSKgel GMPWXL (7.8 mm I.D.×30 cm)×2 to 3 columns
Flow rate: 1.0 mL/min
Eluent: aqueous ionic material solution or mixture thereof with EtOH
Column temperature: 40° C.
Detector: RI
Injection concentration: 0.05-0.5 mass % polymer solid
Injection volume: 100 µL
Calibration curve: third-order approximation curve
Standard samples: ten variations of polyethylene oxide (manufactured by Agilent Technologies Japan, Ltd.)

Synthetic Example 1

While keeping the temperature at 60° C., 28.00 g of acid phosphoxyethyl methacrylate (product name: Phosmer M manufactured by Uni-Chemical Co., nonvolatile content measured by drying process at 100° C. for 1 hour: 91.8%, mixture of acid phosphoxyethyl methacrylate (44.2 mass %), bis[2-(methacryloyloxy)ethyl] phosphate (28.6 mass %) and others (27.2 mass %)) was stirred, and 21.37 g of 2-(dimethylamino)ethyl methacrylate was added thereto dropwise. While keeping the temperature at not more than 20° C., 133.96 g of pure water, then 44.65 g of ethanol (manufactured by Tokyo Chemical Industry Co., Ltd.) and 0.25 g of 2,2'-azobis(N-(2-carboxyethyl)-2-methylpropionamidine) n-hydrate (product name: VA-057 manufactured by Wako Pure Chemical Industries, Ltd.) were added to the mixture sequentially. The resultant mixture was sufficiently stirred to uniformity. The mixture liquid thus obtained which contained the above materials was introduced into a dropping funnel. Separately, 267.93 g of pure water was added to a three-necked flask having a cooling tube. While flowing nitrogen into the flask and while performing stirring, the temperature was increased to reflux temperature. While maintaining this state, the dropping funnel containing the mixture liquid was fitted to the three-necked flask, and the mixture liquid was dropped to the boiling pure water over a period of 2 hours. After the completion of the dropwise addition, the system was heated and stirred for 24 hours while maintaining the above environment. Consequently, 496.16 g of a copolymer-containing varnish having a solid content of about 9.70 mass % was obtained. The GFC analysis of the transparent liquid obtained showed that the weight average molecular weight was about 280,000.

Synthetic Example 2

29.95 g of choline (48-50% aqueous solution manufactured by Tokyo Chemical Industry Co., Ltd.) was added to 25.00 g of acid phosphoxyethyl methacrylate (product name: Phosmer M manufactured by Uni-Chemical Co., nonvolatile content measured by drying process at 100° C. for 1 hour: 91.8%, mixture of acid phosphoxyethyl methacrylate (44.2 mass %), bis[2-(methacryloyloxy)ethyl] phosphate (28.6 mass %) and others (27.2 mass %)) while performing cooling so that the temperature was 35° C. or below. The resultant mixture was stirred to uniformity. While keeping the temperature at not more than 35° C., 20.95 g of an 80% aqueous methacryloylcholine chloride solution (manufactured by Tokyo Chemical Industry Co., Ltd.), 28.67 g of butyl methacrylate (manufactured by Tokyo Chemical Industry Co., Ltd.), 0.70 g of 2,2'-azobis(2,4-dimethylvaleronitrile) (product name: V-65 manufactured by Wako Pure Chemical Industries, Ltd.) and 110.84 g of ethanol were added to the mixture liquid sequentially. Further, an aqueous solution of 0.70 g of 2,2'-azobis(N-(2-carboxyethyl)-2-methylpropionamidine) n-hydrate (product name: VA-057 manufactured by Wako Pure Chemical Industries, Ltd.) in 27.71 g of pure water was added to the solution while keeping the temperature at not more than 35° C. The resultant mixture was sufficiently stirred to uniformity. The mixture liquid thus obtained which contained the above materials was introduced into a dropping funnel. Separately, 56.81 g of pure water and 131.62 g of ethanol were added to a three-necked flask having a cooling tube. While flowing nitrogen into the flask and while performing stirring, the temperature was increased to reflux temperature. While maintaining this state, the dropping funnel containing the mixture liquid was fitted to the three-necked flask, and the mixture liquid was dropped to the boiling mixture of pure water and ethanol over a period of 1 hour. After the completion of the dropwise addition, the system was heated and stirred for 24 hours while maintaining the above environment. After 24 hours, the system was cooled. Consequently, 432.92 g of a copolymer-containing varnish having a solid content of about 19.68 mass % was obtained. The GFC analysis of the colloidal liquid obtained showed that the weight average molecular weight was about 8,500.

Example 1

28.73 g of pure water, 13.95 g of ethanol, and 0.85 g of a 1 mol/L aqueous sodium hydroxide solution (1 N) (manufactured by KANTO CHEMICAL CO., INC.) were added to 5.00 g of the copolymer-containing varnish obtained in Synthetic Example 1. The mixture was sufficiently stirred to give a coating agent. The pH was 7.5. A commercial silicon wafer for semiconductor evaluation, and a culture plate (Corning (registered trademark) #351172 (96 wells, volume 0.37 mL) (material: polystyrene) were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 147 Å.

Example 2

50.14 g of pure water, 22.80 g of ethanol, and 0.68 g of a 1 mol/L aqueous sodium hydroxide solution (1 N) (manufactured by KANTO CHEMICAL CO., INC.) were added to 4.00 g of the copolymer-containing varnish obtained in Synthetic Example 1. The mixture was sufficiently stirred to give a coating agent. The pH was 7.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 90 Å.

Example 3

64.77 g of pure water, 28.74 g of ethanol, and 0.51 g of a 1 mol/L aqueous sodium hydroxide solution (1 N) (manufactured by KANTO CHEMICAL CO., INC.) were added to 3.00 g of the copolymer-containing varnish obtained in Synthetic Example 1. The mixture was sufficiently stirred to give a coating agent. The pH was 7.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 53 Å.

Example 4

66.86 g of pure water, 28.98 g of ethanol, and 0.17 g of a 1 mol/L aqueous sodium hydroxide solution (1 N) (manufactured by KANTO CHEMICAL CO., INC.) were added to 1.00 g of the copolymer-containing varnish obtained in Synthetic Example 1. The mixture was sufficiently stirred to give a coating agent. The pH was 7.5. A silicon wafer and a culture plate similar to those in Example 1 were dipped into the coating agent and were dried in an oven at 50° C. for 24 hours. Thereafter, the wafer and the plate were soaked in PBS for 24 hours and were sufficiently washed with pure water. Thus, coating films were formed on the silicon wafer and the plate. The film thickness of the coating film on the silicon wafer was measured with an ellipsometer to be 38 Å.

Example 5

2.45 g of 1 mol/L hydrochloric acid (1 N) (manufactured by KANTO CHEMICAL CO., INC.), 46.61 g of pure water, and 130.19 g of ethanol were added to 20.00 g of the copolymer-containing varnish obtained in Synthetic Example 2. The mixture was sufficiently stirred to give a coating agent. The pH was 3.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 723 Å.

Example 6

1.23 g of 1 mol/L hydrochloric acid (1 N) (manufactured by KANTO CHEMICAL CO., INC.), 52.83 g of pure water, and 133.97 g of ethanol were added to 10.00 g of the copolymer-containing varnish obtained in Synthetic Example 2. The mixture was sufficiently stirred to give a coating agent. The pH was 3.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 174 Å.

Example 7

0.61 g of 1 mol/L hydrochloric acid (1 N) (manufactured by KANTO CHEMICAL CO., INC.), 55.93 g of pure water, and 135.87 g of ethanol were added to 5.00 g of the copolymer-containing varnish obtained in Synthetic Example 2. The mixture was sufficiently stirred to give a coating agent. The pH was 3.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 74 Å.

Example 8

2.31 g of 1 mol/L hydrochloric acid (1 N) (manufactured by KANTO CHEMICAL CO., INC.), 95.29 g of pure water, and 227.71 g of ethanol were added to 5.00 g of the copolymer-containing varnish obtained in Synthetic Example 2. The mixture was sufficiently stirred to give a coating agent. The pH was 3.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 52 Å.

Example 9

0.12 g of 1 mol/L hydrochloric acid (1 N) (manufactured by KANTO CHEMICAL CO., INC.), 58.42 g of pure water, and 137.38 g of ethanol were added to 1.00 g of the copolymer-containing varnish obtained in Synthetic Example 2. The mixture was sufficiently stirred to give a coating agent. The pH was 3.5. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 18 Å.

Comparative Example 1

1.2 g of poly(2-hydroxyethyl methacrylate) (manufactured by Sigma-Aldrich Japan) was dissolved into 29.98 g of ethanol and 2 g of pure water. The solution was sufficiently stirred to give a coating agent. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 1960 Å.

Comparative Example 2

1.0 g of poly(2-hydroxyethyl methacrylate) (manufactured by Sigma-Aldrich Japan) was dissolved into 95.0 g of ethanol and 4.0 g of pure water. The solution was sufficiently stirred to give a coating agent. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 311 Å.

Comparative Example 3

0.5 g of poly(2-hydroxyethyl methacrylate) (manufactured by Sigma-Aldrich Japan) was dissolved into 95.0 g of ethanol and 4.5 g of pure water. The solution was sufficiently stirred to give a coating agent. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 96 Å.

Comparative Example 4

0.3 g of poly(2-hydroxyethyl methacrylate) (manufactured by Sigma-Aldrich Japan) was dissolved into 95.0 g of ethanol and 4.7 g of pure water. The solution was sufficiently stirred to give a coating agent. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 61 Å.

Comparative Example 5

0.1 g of poly(2-hydroxyethyl methacrylate) (manufactured by Sigma-Aldrich Japan) was dissolved into 95.0 g of ethanol and 4.9 g of pure water. The solution was sufficiently stirred to give a coating agent. A silicon wafer and a culture plate similar to those in Example 1 were dipped into the coating agent and were dried in an oven at 50° C. for 24 hours. Thereafter, the wafer and the plate were sufficiently washed with pure water. Thus, coating films were formed on the silicon wafer and the plate. The film thickness of the coating film on the silicon wafer was measured with an ellipsometer to be 20 Å.

Example 10/Comparative Example 6

Figure 2:
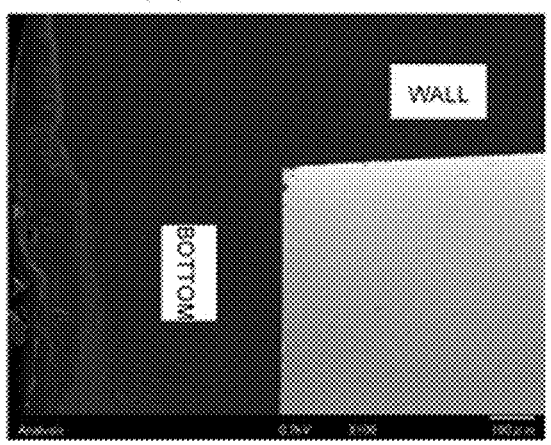
FIGS. 2(A) and 2(B) are sectional SEM images of wells having coating films obtained in Example 10 and Comparative Example 6, respectively.
Figure 2:
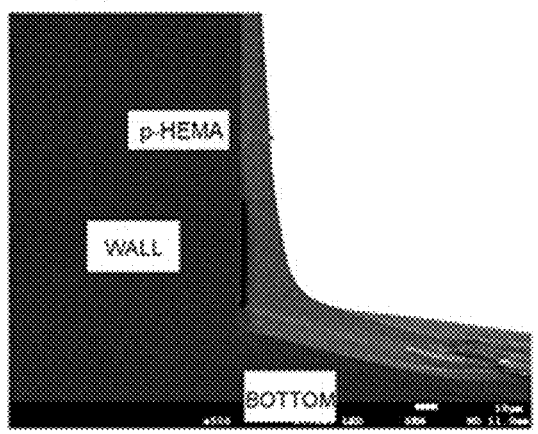
Figure 3:
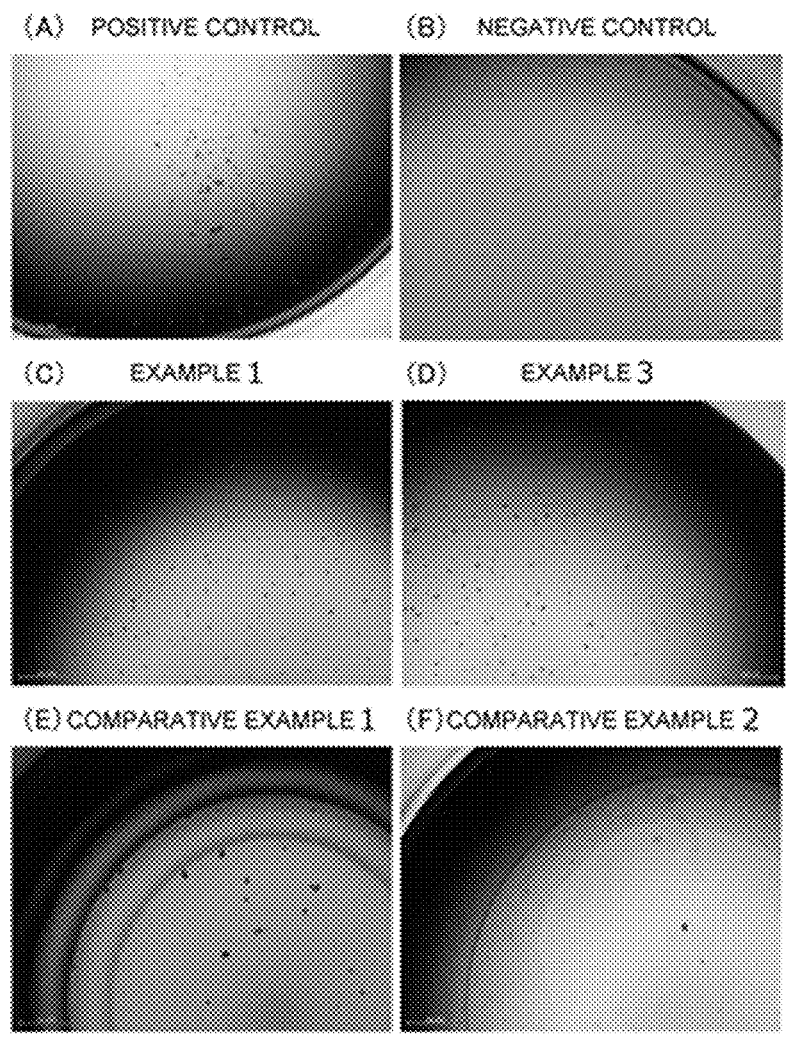
FIGS. 3(A) to 3(F) are the results of observation (magnification: ×4) with an inverted microscope (CKX31 manufactured by Olympus Corporation) of cell adhesion to positive and negative control wells and to wells (Nos. 1, 3, 5 and 6) coated with coating agents of Examples 1 and 3 and Comparative Examples 1 and 2, after 4 days of culture in Test Example 1 (Observation of cell adhesion).
Figure 4A:
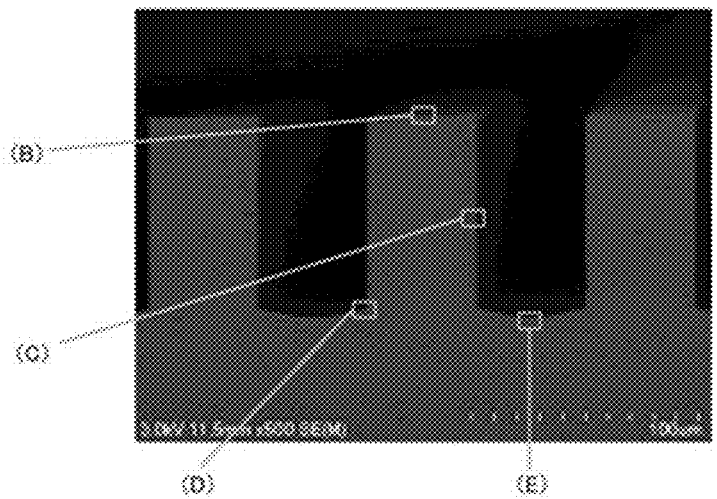
FIG. 4A is a sectional SEM image of a coated stepped substrate obtained by dropping a coating agent of Example 1 onto a silicon substrate of Test Example 3, followed by spin coating and drying.
Figure 4B:
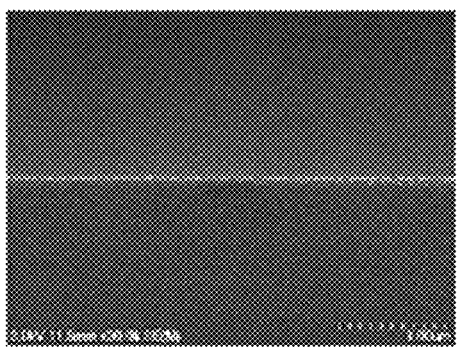
FIG. 4B is an enlarged view of (B) in FIG. 4A.
Figure 4C:
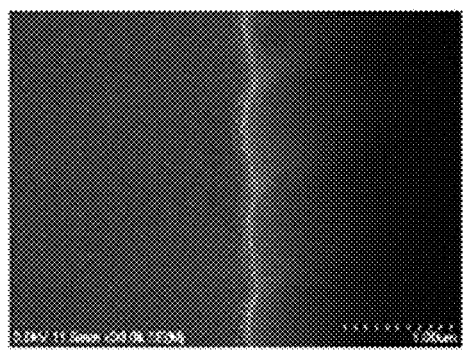
FIG. 4C is an enlarged view of (C) in FIG. 4A.
Figure 4D:
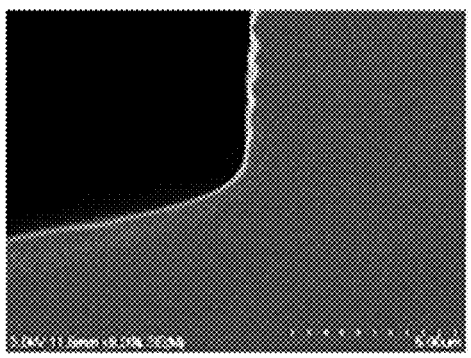
FIG. 4D is an enlarged view of (D) in FIG. 4A.
Figure 4E:
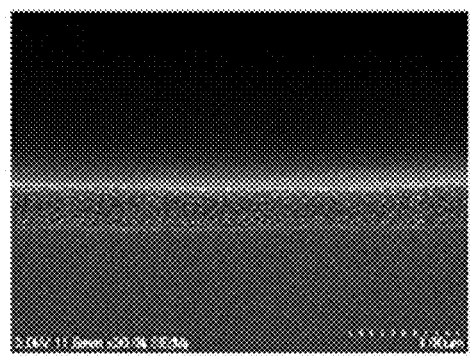
FIG. 4E is an enlarged view of (E) in FIG. 4A.
Figure 5A:
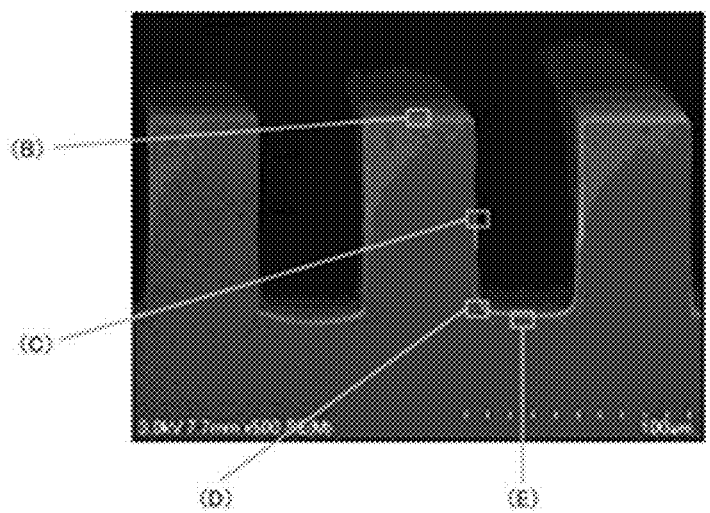
FIG. 5A is a sectional SEM image of a coated stepped substrate obtained by dropping a coating agent of Comparative Example 1 onto a silicon substrate of Test Example 3, followed by spin coating and drying.
Figure 5B:
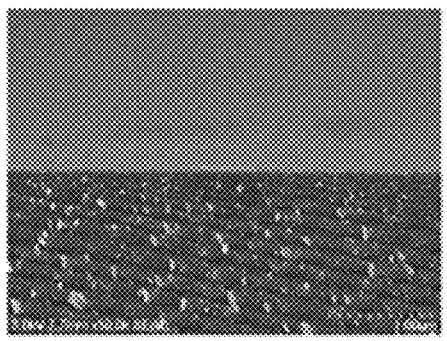
FIG. 5B is an enlarged view of (B) in FIG. 5A.
Figure 5C:
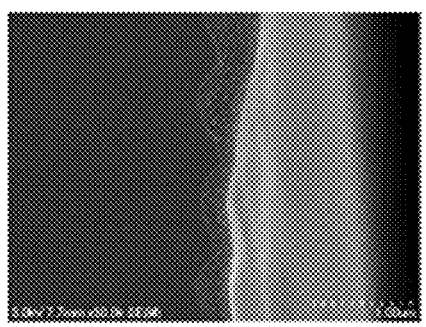
FIG. 5C is an enlarged view of (C) in FIG. 5A.
Figure 5D:
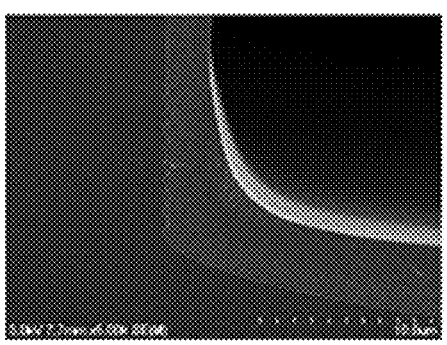
FIG. 5D is an enlarged view of (D) in FIG. 5A.
Figure 5E:
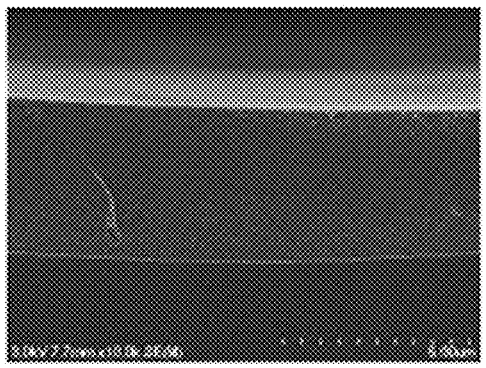
FIG. 5E is an enlarged view of (E) in FIG. 5A.

The coating agents prepared in Example 1 and Comparative Example 1 were poured, each 100 µL, into respective wells of Corning (registered trademark) #3712 (384 wells, volume 100 µL/well) (material: polystyrene). The agents were dried in an oven at 50° C. for 24 hours. Thereafter, the wells were washed three times with each of 100 µL of PBS and the same volume of pure water. The inside of the wells was photographed from above, the results being shown in FIG. 1. In the upper two wells in the picture (Example 10), the coating film was uniform and showed the bottom of the well clearly therethrough, while the film in the lower two wells in the picture (Comparative Example 6) was Nonuniformly Aggregated To examine the results in more detail, cross sections were observed by SEM. The results are shown in FIGS. 2(A) and 2(B). In FIG. 2(A), which is the sectional SEM image of the upper well (Example 10) in the picture of FIG. 1, the edge at the corner (about 90 to 95°) between the bottom and the wall was clearly visible. Based on the fact that the film thickness in Example 1 was 147 Å, it was assumed that the film formed here would be approximately 100 to 200 Å thick, but the thickness could not be identified in the sectional image (no contrast was observed in SEM because the substrate and the film of the invention were both organic materials and were very thin). In FIG. 2(B), which is the sectional SEM image of the lower well (Comparative Example 1) in the picture of FIG. 1, the film had been accumulated particularly at the edge of the recess in the substrate (the thickness of the film was up to 20 µm or more).

From the foregoing, the coating agent prepared in Example 1 successfully formed, in one coating operation, a uniform ultrathin film (for example, 300 Å or less) onto a structural base which included a structural portion composed of at least two flat faces adjacent to one another and having an angle between each two of the flat faces of $0 < \theta < 180°$.

Test Example 1: Cell Adhesion Inhibitory Effects (Preparation of Coated Plates)
The coating agents of Examples 1 to 4 were poured, each 200 µL, into respective wells (Nos. 1 to 4) of Corning #351172 (96 wells, volume 0.37 mL) (material: polystyrene). The coating agents were allowed to stand for 1 hour, and the excess portions were removed. The plate was dried in an oven at 50° C. for 24 hours. The coating agents of Comparative Examples 1 to 5 were poured, each 30 µL, into respective wells (Nos. 5 to 9) and were dried in an oven at 50° C. for 24 hours. The wells (Nos. 1 to 9) coated with the coating agents of Examples 1 to 4 and Comparative Examples 1 to 5 were washed with 200 µL of pure water three times and were ready for testing. As a positive control sample, a commercial low cell adhesion plate (#3474 manufactured by Corning Inc.) was used. As a negative control, an uncoated 96-well cell culture plate (#351172 manufactured by Corning Inc.) was used.
(Preparation of Cells)
Mouse embryonic fibroblasts C3H10T1/2 (available from DS Pharma Biomedical Co., Ltd.) were used. The medium used for the culturing of the cells was BME medium (available from Thermo Fisher Scientific Inc.) containing 10% FBS (available from HyClone Laboratories, Inc.) and L-glutamine-penicillin-streptomycin stabilized solution (available from SIGMA-ALDRICH Co. LLC.). The cells were statically cultured for at least 2 days in a 10 cm-diameter petri dish (10 mL culture medium) in a $CO_2$ incubator at 37° C. while keeping 5% carbon dioxide concentration. Subsequently, the cells were washed with 5 mL of PBS, and thereafter 1 mL of trypsin-EDTA solution (available from Invitrogen Co.) was added thereto to separate the cells, which were then each suspended in 10 mL of the above-mentioned medium. The suspensions were centrifuged (model No. LC-200 manufactured by TOMY SEIKO CO., LTD., 1000 rpm/3 min, room temperature), the supernatant was removed, and the above-mentioned medium was added. Cell suspensions were thus prepared.
(Cell Adhesion Experiment)
To the wells (Nos. 1 to 9) of the plate prepared as described above, the positive control and the negative control, the cell suspensions were added in a volume of 100 µL so that each well would contain $2 \times 10^3$ cells/well. Thereafter, the wells were allowed to stand in a $CO_2$ incubator at 37° C. for 4 days while keeping 5% carbon dioxide concentration.
(Observation for Cell Adhesion)
After 4 days of culturing, the cell adhesion was compared among the wells (Nos. 1 to 9) of the plate prepared as described above, the positive control and the negative control based on observation (magnification: ×4) with an inverted microscope (CKX31 manufactured by Olympus Corporation). No cell adhesion was seen in the wells (Nos. 1 to 3 and 5) of the plate coated with the coating agents of Examples 1 to 3 and Comparative Example 1, and the wells of the positive control plate. The cells had been adhered to the wells (Nos. 4 and 6 to 9) of the plate coated with the coating agents of Example 4 and Comparative Examples 2 to 5. The results (after 4 days of culturing) of the wells (the positive and negative controls, and Nos. 1, 3, 5 and 6) are shown in FIGS. 3(A) to 3(F), respectively. Further, Cell Counting Kit-8 solution (available from DOJINDO LABORATORIES) was added in 10 µL per well, and the wells were allowed to stand in a $CO_2$ incubator at 37° C. for 2 hours. Thereafter, the absorbance at 450 nm was measured with an absorptiometer (SpectraMax manufactured by Molecular Devices, LLC.). The absorbance measured with respect to a well containing only the medium was subtracted from each of the values that were measured. The results are described in Table 1.

TABLE 1

Absorbance measurement

| Well No. | Coating agent | Absorbance |
| --- | --- | --- |
| 1 | Example 1 | 0.041 |
| 2 | Example 2 | 0.045 |
| 3 | Example 3 | 0.053 |
| 4 | Example 4 | 0.082 |
| 5 | Comparative Example 1 | 0.031 |
| 6 | Comparative Example 2 | 0.097 |
| 7 | Comparative Example 3 | 0.096 |
| 8 | Comparative Example 4 | 0.115 |
| 9 | Comparative Example 5 | 0.153 |
| Positive control (#3474) | | 0.037 |
| Negative control (#351172) | | 0.887 |

In the wells of the plate coated with the coating agents of Examples 1 to 3 and Comparative Example 1, and the wells in the positive control plate, there was no cell adhesion and the cells had formed aggregates (spheroids).

Test Example 2: Protein Adsorption Inhibitory Effects (Preparation of Coated Plates)

The coating agents of Examples 6 to 9 and Comparative Examples 1 to 5 were poured, each 250 μL, into respective wells of a flat-bottomed plate manufactured by Youken Science Co., Ltd. (96 wells, volume 0.37 mL) (material: polystyrene). The coating agents were allowed to stand for 1 hour, and the excess portions were removed. The plate was dried at room temperature for 18 hours. Thereafter, the coated wells (Nos. 10 to 18) were washed with 250 μL of pure water three times and were dried, thus being ready for testing. As a negative control, an uncoated 96-well plate was used.

(Protein Adsorption Experiment)

Horseradish peroxidase (abbreviated as HRP) labeled Goat Anti-Mouse IgG (available from SoutherBioteck) was diluted with phosphate buffered physiological saline, and was added to the coated wells prepared above. The wells were allowed to stand at room temperature for 30 minutes, and were washed with phosphate buffered physiological saline. Thereafter, TMB 1-Component Microwell Peroxidase Substrate, SureBlue (available from Kirkegaard & Perry Laboratories, Inc., abbreviated as TMB) was added and reacted with HRP. The reaction was terminated by the addition of TMB Stop Solution (available from Kirkegaard & Perry Laboratories, Inc.). The optical density (450 nm) of this TMB solution was measured with a plate reader (SPECTRAMAX 190, Molecular Devices), and was evaluated as the amount of protein adsorption. The results are described in Table 2.

TABLE 2

| Absorbance measurement | | |
|---|---|---|
| Well No. | Coating agent | Absorbance |
| 10 | Example 6 | 0.006 |
| 11 | Example 7 | 0.011 |
| 12 | Example 8 | 0.004 |
| 13 | Example 9 | 0.024 |
| 14 | Comparative Example 1 | 0.021 |
| 15 | Comparative Example 2 | 0.214 |
| 16 | Comparative Example 3 | 0.601 |
| 17 | Comparative Example 4 | 0.481 |
| 18 | Comparative Example 5 | 0.885 |
| | Negative control | 0.482 |

The coating films of Examples 6 to 9 and Comparative Example 1 were shown to inhibit protein adsorption.

Test Example 3: Evaluation of Irregularity-Conforming Properties (Preparation of Coated Stepped Substrates)

The coating agents prepared in Example 1 and Comparative Example 1 were dropped onto silicon substrates which included a structure with L/S=1/1, 50 μm pitches and 100 μm steps. Spin coating was performed at 1500 rpm/1 min, and the films were dried at 50° C./24 h. Coated stepped substrates (Nos. 1 and 2) were thus fabricated.

(SEM Evaluation of Coated Stepped Substrates)

The coated stepped substrates (Nos. 1 and 2) were cut so as to expose a cross section of the structure with L/S=1/1, 50 μm pitches and 100 μm steps, and platinum was deposited onto the surface. Thereafter, the sectional shape was evaluated by SEM. The center of the raised portions, the center of the recesses, and the center of the walls of the stepped substrates were observed to determine the film thicknesses (Å) of the coating films formed on the silicon stepped substrates using the coating agents of Example 1 and Comparative Example 1. The results are shown in Table 3 and in FIGS. 4A to 4E and FIGS. 5A to 5E.

TABLE 3

| | | Film thickness (Å) | | |
|---|---|---|---|---|
| Coated stepped substrate No. | Coating agent | Center of raised portions | Center of recesses | Center of walls |
| 1 | Example 1 | 50~100 | 300~400 | 100~200 |
| 2 | Comparative Example 1 | 10~20 | 35000~45000 | 100~500 |

The coating film obtained using the coating agent of Example 1 was a thin film which was 400 Å or less in thickness at all of the center of the raised portions, the center of the recesses, and the center of the walls of the structure in the silicon substrate, the difference between the maximum film thickness and the minimum film thickness being not more than 350 Å.

Example 11

31.5 g of pure water, 1.35 g of ethanol, and 0.24 g of a 1 mol/L aqueous sodium hydroxide solution (1 N) (manufactured by KANTO CHEMICAL CO., INC.) were added to 5.00 g of the copolymer-containing varnish obtained in Synthetic Example 1. The mixture was sufficiently stirred to give a coating agent. The pH was 7.3. The silicon wafer and the substrates described below were dipped into the coating agent and were dried in an oven at 45° C. for 24 hours. Thereafter, the wafer and the substrates were sufficiently washed with PBS and pure water. Thus, coating films were formed on the silicon wafer and the substrates. The film thickness of the coating film on the silicon wafer was measured with an optical interferometric thickness gauge to be 90 Å.

Example 12

1.19 g of 1 mol/L hydrochloric acid (1 N) (manufactured by KANTO CHEMICAL CO., INC.), 26.78 g of pure water, and 62.54 g of ethanol were added to 10.00 g of the copolymer-containing varnish obtained in Synthetic Example 2. The mixture was sufficiently stirred to give a coating agent. The pH was 3.5. Coating films were formed on the silicon wafer and the substrates in the same manner as in Example 11. The film thickness of the coating film on the silicon wafer was measured with an optical interferometric thickness gauge to be 112 Å.

(Silicon Wafers)

Commercial silicon wafers for semiconductor evaluation were used directly.

(Substrates)

The substrates used were as follows: polyvinyl chloride (PVC), polystyrene petri dishes (PS petri dishes) for cell culture, polystyrene (PS), polyethersulfone (PES), polyethylene terephthalate (PET), polypropylene (PP), polyethylene (PE), glass substrates, two types of cycloolefin polymer (COP) sheets (Zeonor (manufactured by ZEON CORPORATION) and Zeonex (manufactured by ZEON CORPORATION)), and two types of polydimethylsiloxane (PDMS) sheets. The glass substrates were plasma-treated substrates and plasma-untreated substrates.

Plasma Treatment Conditions:
  Apparatus: SEDE-GE (soft-etching device) manufactured by MEIWAFOSIS CO., LTD.
  Etching gas: air
  Plasma treatment time: 1 minute
  Heating stage temperature: 25° C.
  Current: 5 mA Test Example 4

[Evaluation of Static Contact Angle]

The substrates coated with the coating film that were obtained in Examples 11 and 12 were evaluated with an automatic contact angle meter (DM-701 manufactured by Kyowa Interface Science Co., LTD.). The evaluation was made at 25° C. (in air and water). The static contact angle was evaluated by measuring the contact angle of a water droplet in air and also by measuring the contact angle of a bubble on the inverted substrate suspended in water, namely, the submerged contact angle. The results of the measurement in air are described in Table 4, and the results of the measurement in water are set forth in Table 5.

TABLE 4

| Sample | Water contact angle (°) in air | | |
|---|---|---|---|
| | No coating | Example 11 | Example 12 |
| Vinyl chloride | 89.0 | 74.3 | 88.3 |
| PS (Petri dish) | 85.8 | 85.6 | 71.3 |
| PS | 99.1 | 69.7 | 86.1 |
| PES | 80.5 | 29.6 | 27.7 |
| PET | 84.6 | 67.4 | 87.6 |
| PP | 88.2 | 84.7 | 90.0 |
| PE | 98.4 | 68.0 | 89.8 |
| Zeonor | 91.7 | 86.9 | 89.9 |
| Zeonex | 99.3 | 87.1 | 73.0 |
| PDMS1 | 114.5 | 106.7 | 109.4 |
| PDMS2 | 108.0 | 105.2 | 104.9 |
| Glass (not plasma treated) | 64.5 | — | — |
| Glass (plasma treated) | <5 | — | — |

TABLE 5

| Sample | Bubble contact angle (°) in water | | |
|---|---|---|---|
| | No coating | Example 11 | Example 12 |
| Vinyl chloride | 107.3 | 155.6 | 157.9 |
| PS (Petri dish) | 86.9 | 156.8 | 156.4 |
| PS | 92.2 | 154.4 | 156.2 |
| PES | 112.3 | 157.2 | 154.9 |
| PET | 114.6 | 149.1 | 157.9 |
| PP | 82.6 | 155.9 | 157.3 |
| PE | 91.4 | 154.2 | 155.5 |
| Zeonor | 91.2 | 153.7 | 158.7 |
| Zeonex | 87.0 | 156.4 | 157.4 |
| PDMS1 | 112.4 | 157.2 | 158.7 |
| PDMS2 | 85.5 | 156.1 | 156.4 |
| Glass (not plasma treated) | 128.6 | — | — |
| Glass (plasma treated) | >160 | — | — |

From the results of the measurement in air, the substrates having the coating film did not show a significant difference in contact angle from those without coating films. That is, no behavior was seen which indicated that the coating treatment added hydrophilicity to the substrates. On the other hand, the results of the contact angle measurement in water show that the substrates having the coating film attained marked hydrophilization compared to without coating treatment. This means that a coating had been formed on the substrates.

INDUSTRIAL APPLICABILITY

The structural base of the present invention includes, on at least a portion of the surface thereof, a uniform coating film which has irregularity-conforming properties with a difference between the maximum film thickness and the minimum film thickness of not more than 1000 Å, or preferably not more than 300 Å. Even in the case where the structural base of the invention includes a structural portion composed of at least two flat faces adjacent to one another, the angle between each two of the flat faces being $0<\theta<180°$, the coating film attains uniformity, or more specifically, is not significantly thicker at the edge or bottom of the structural portion due to the coating agent having been accumulated there, and attains a difference between the maximum film thickness and the minimum film thickness of not more than 1000 Å, or preferably not more than 300 Å. Thus, where the coating film is one capable of inhibiting biomaterial adhesion, for example, where the coating film includes a copolymer that includes a repeating unit containing a group represented by the aforementioned formula (a), and a repeating unit containing a group represented by the aforementioned formula (b), the structural base may be used in an application where the adhesion of biomaterials is not desired; for example, the structural base may be a cell culture vessel or, in particular, a microwell plate. For example, a microwell plate that includes a uniform coating film with a difference between the maximum film thickness and the minimum film thickness of not more than 1000 Å, or preferably not more than 300 Å is advantageous not only in that it has a sufficient resistance to biomaterial adhesion but also in that optical measurement is not adversely affected because the film thickness is below the measurement wavelength of general plate readers (for example, 340 to 850 nm).

The invention claimed is:

1. A method for producing a cell culture vessel for forming cell aggregates, comprising a step of applying a coating agent onto a cell culture vessel including a structural portion composed of at least two flat faces adjacent to one another, the angle θ between each two of the flat faces being $70<\theta<110°$, in one operation to form a surface coated with a coating film thereby forming a coated surface of the cell culture vessel, the coated surface having a difference between the maximum film thickness and the minimum film thickness of not more than 350 Å and a thickness of 10 to 400 Å,
   the coating agent comprising a copolymer including a repeating unit containing a group represented by the following formula (a), and a repeating unit containing a group represented by the following formula (b):

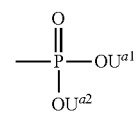

-continued

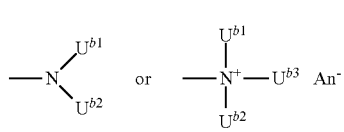
(b)

wherein $U^{a1}$, $U^{a2}$, $U^{b1}$, $U^{b2}$ and $U^{b3}$ are each independently a hydrogen atom or a $C_{1-5}$ linear or branched alkyl group, and An is an anion selected from the group consisting of halide ion, inorganic acid ion, hydroxide ion and isothiocyanate ion.

2. The production method according to claim 1, wherein the copolymer includes repeating units represented by the following formulae (a1) and (b1):

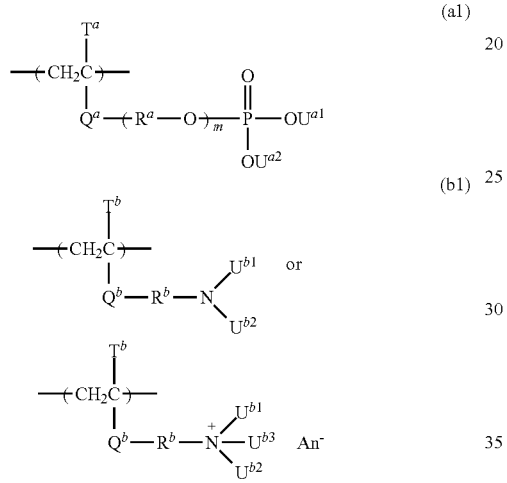

wherein
$T^a$ and $T^b$ are each independently a hydrogen atom or a $C_{1-5}$ linear or branched alkyl group;
$Q^a$ and $Q^b$ are each independently a single bond, an ester bond or an amide bond;
$R^a$ and $R^b$ are each independently a $C_{1-10}$ linear or branched alkylene group which may be substituted with a halogen atom;
$U^{a1}$, $U^{a2}$, $U^{b1}$, $U^{b2}$ and $U^{b3}$ are each independently a hydrogen atom or a $C_{1-5}$ linear or branched alkyl group;
An⁻ is an anion selected from the group consisting of halide ion, inorganic acid ion, hydroxide ion and isothiocyanate ion; and
m is an integer of 0 to 6.

3. The production method according to claim 1, wherein the water contact angle in air of the coated portions of the surface of the cell culture vessel is 0 to 120°, or the bubble contact angle in water of the surface of the structural base is 80 to 180°.

4. The production method according to claim 1, wherein the surface that is coated with the coating film is composed of a cycloolefin polymer or polydimethylsiloxane.

5. A method for forming a coating film on a surface of a cell culture vessel, comprising only steps of applying a coating agent onto the surface of the cell culture vessel and drying it, the coating film having a difference between the maximum film thickness and the minimum film thickness of not more than 350 Å and a film thickness of 10 to 400 Å at all coated portions of the surface of the cell culture vessel, wherein the cell culture vessel includes a structural portion composed of at least two flat faces adjacent to one another, the angle θ between each two of the flat faces being 70<θ<110°,
the coating agent comprising a copolymer including a repeating unit containing a group represented by the following formula (a), and a repeating unit containing a group represented by the following formula (b):

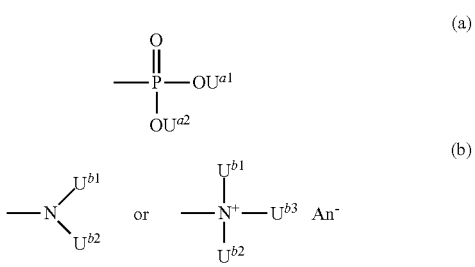

wherein $U^{a1}$, $U^{a2}$, $U^{b1}$, $U^{b2}$ and $U^{b3}$ are each independently a hydrogen atom or a $C_{1-5}$ linear or branched alkyl group, and An is an anion selected from the group consisting of halide ion, inorganic acid ion, hydroxide ion and isothiocyanate ion.

6. The method according to claim 5, wherein the copolymer includes repeating units represented by the following formulae (a1) and (b1):

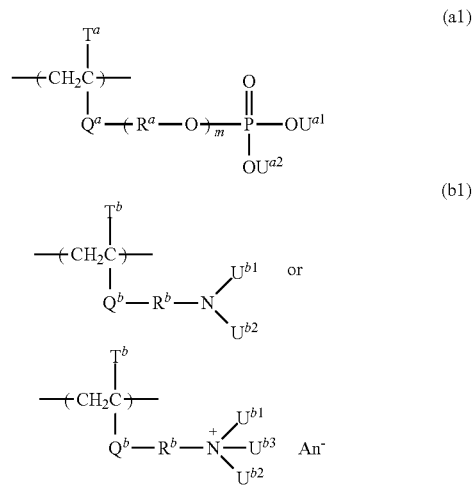

wherein
$T^a$ and $T^b$ are each independently a hydrogen atom or a $C_{1-5}$ linear or branched alkyl group;
$Q^a$ and $Q^b$ are each independently a single bond, an ester bond or an amide bond;
$R^a$ and $R^b$ are each independently a $C_{1-10}$ linear or branched alkylene group which may be substituted with a halogen atom;
$U^{a1}$, $U^{a2}$, $U^{b1}$, $U^{b2}$ and $U^{b3}$ are each independently a hydrogen atom or a $C_{1-5}$ linear or branched alkyl group;
An⁻ is an anion selected from the group consisting of halide ion, inorganic acid ion, hydroxide ion and isothiocyanate ion; and
m is an integer of 0 to 6.

7. The method according to claim 5, wherein the water contact angle in air of the coated portions of the surface of the cell culture vessel is 0 to 120° or the bubble contact angle in water of the surface of the structural base is 80 to 180°.

8. The method according to claim 5, wherein the surface that is coated with the coating film is composed of a cycloolefin polymer or polydimethylsiloxane.

\* \* \* \* \*